(12) United States Patent
Ebihara et al.

(10) Patent No.: US 7,516,685 B2
(45) Date of Patent: Apr. 14, 2009

(54) PTO TRANSMISSION STRUCTURE

(75) Inventors: Tomoyuki Ebihara, Amagasaki (JP); Rei Maeda, Amagasakai (JP); Hirohiko Kawada, Amagasaki (JP); Toshiyuki Hasegawa, Amagasaki (JP); Yoshitaka Ishimaru, Amagasaki (JP); Tomoyuki Tsuji, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 876 days.

(21) Appl. No.: 11/049,155

(22) Filed: Feb. 3, 2005

(65) Prior Publication Data

US 2005/0172740 A1  Aug. 11, 2005

(30) Foreign Application Priority Data

Feb. 9, 2004 (JP) .............................. 2004-031593

(51) Int. Cl.
*F16H 37/06* (2006.01)
*F16H 37/00* (2006.01)
*F16H 57/02* (2006.01)

(52) U.S. Cl. ...................... 74/665 G; 74/15.6; 74/606 R
(58) Field of Classification Search ................. 475/198, 475/200; 74/15.6, 15.63, 665 F, 665 G, 665 GA, 74/665 S, 665 T, 606 R; 180/53.2, 53.7, 180/53.8
See application file for complete search history.

(56) References Cited

U.S. PATENT DOCUMENTS

| | | | | |
|---|---|---|---|---|
| 4,750,580 A | * | 6/1988 | Umemoto | 180/247 |
| 5,913,950 A | * | 6/1999 | Matsufuji | 74/730.1 |
| 6,003,391 A | * | 12/1999 | Kojima et al. | 74/15.66 |
| 6,119,552 A | * | 9/2000 | Matsufuji | 74/606 R |
| 7,163,077 B2 | * | 1/2007 | Hasegawa et al. | 180/305 |
| 7,398,853 B2 | * | 7/2008 | Ohtsuki et al. | 180/312 |

FOREIGN PATENT DOCUMENTS

JP 2003-94970 4/2003

* cited by examiner

*Primary Examiner*—Roger Pang
(74) *Attorney, Agent, or Firm*—Sterne, Kessler, Goldstein & Fox P.L.L.C.

(57) ABSTRACT

There is provided a PTO transmission structure including a PTO driving shaft operatively connected to a driving source, a PTO driven shaft arranged in a downstream side in a transmission direction of the PTO driving shaft, a PTO clutch unit for selectively performing power transmission/power interruption from the PTO driving shaft to the PTO driven shaft, and a transmission case for supporting the PTO driving shaft and the PTO driven shaft and for accommodating the PTO clutch unit. The transmission case has a case main body which includes a first wall having a first hole for supporting the PTO driving shaft, and a second wall having a second hole for supporting the PTO driven shaft, the second wall being spaced apart from the first wall so as to define a first accommodating space to position the PTO clutch unit between the first wall and the second wall. The PTO clutch unit includes a drive-side member operatively connected to the PTO driving shaft, and an output shaft member operatively connected to the PTO driven shaft. Each of the PTO driving shaft and the PTO driven shaft is connected to the drive-side member and the output shaft member, respectively, of the PTO clutch unit by inserting the PTO driving shaft through the first hole from the upstream side in the transmission direction of the first wall and inserting the PTO driven shaft through the second hole from the downstream side in the transmission direction of said second wall with said PTO clutch unit positioned in the first accommodating space.

14 Claims, 18 Drawing Sheets

PTO TRANSMISSION STRUCTURE

BACKGROUND OF THE INVENTION

1. Field of the Invention

The present invention relates to a PTO transmission structure for externally drawing out power from a driving source, which PTO transmission structure is inserted with a PTO clutch unit.

2. Related Art

In working vehicles such as tractors, a PTO system transmission mechanism for externally outputting power from a driving source is provided in addition to a traveling system transmission mechanism for transmitting power from the driving source to driving wheels (see e.g., JP-A 2003-94970, which will be hereinafter referred to as "cited reference").

As described in the cited reference, the PTO system transmission mechanism normally includes a PTO clutch unit for selectively engaging/interrupting the power transmission from the driving source, and is configured to allow drawing of power only when necessary.

The PTO clutch unit is arranged between a PTO driving shaft operatively connected to the driving source and a PTO driven shaft arranged on a downstream side in the transmission direction of the PTO driving shaft; however, in the conventional PTO system transmission mechanism, the assembling task of the PTO clutch unit cannot be efficiently carried out.

That is, in the conventional PTO system transmission mechanism, a transmission case includes a transmission case main body having a wall integrally formed therein at the rear of a differential gear unit, which transmission case main body being opened at the downstream side (generally, at the rear in the longitudinal direction of a vehicle) in the transmission direction, and a lid member connected to the transmission case main body so as to block the opening.

The PTO clutch unit and the PTO driven shaft are incorporated in the transmission case through the opening, and are supported by the wall of the transmission case main body and the lid member.

In the conventional configuration, the lid member must be connected to the transmission case main body with the PTO clutch unit and the PTO driven shaft, connected to the PTO clutch unit, engaged with the lid member; thus, the assembling task of the PTO clutch unit is very troublesome.

Further, since the PTO clutch unit and the PTO driven shaft are long in the axial direction, the supporting distance of the assembly consisting of the PTO clutch unit and the PTO driven shaft is long and the stability is not satisfactory.

Moreover, a wasted space is created above the differential gear unit, thereby making the entire length of the transmission case long.

The PTO clutch unit is provided with a brake mechanism depending on the specification of the vehicle.

The brake mechanism is configured to apply/release the braking power to/from the PTO driven shaft when the PTO clutch unit is in the power interrupting state/the power transmitting state, respectively.

More specifically, the brake mechanism comprises a brake member which is relatively non-rotatable with respect to the PTO driven shaft during braking power application, and a fixed part for engaging with the brake member to stop the rotation of the brake member.

However, in the conventional configuration in which the PTO unit is supported by the wall and the lid member, the fixed part cannot be easily arranged, thereby complicating the structure of the transmission case main body.

BRIEF SUMMARY OF THE INVENTION

The present invention, in view of the above conventional art, aims to provide a PTO transmission structure allowing an easy assembling of the PTO clutch unit while maintaining a stable support of the PTO clutch unit.

The present invention also aims to provide a PTO transmission structure in which a fixed part in the PTO brake mechanism is easily arranged when the PTO clutch unit includes the PTO brake mechanism.

According to the present invention, there is provided a PTO transmission structure including a PTO driving shaft operatively connected to a driving source, a PTO driven shaft arranged in a downstream side in a transmission direction of said PTO driving shaft, a PTO clutch unit for selectively performing power transmission/power interruption from the PTO driving shaft to the PTO driven shaft, and a transmission case for supporting the PTO driving shaft and the PTO driven shaft and for accommodating the PTO clutch unit.

The transmission case has a case main body which includes a first wall having a first hole for supporting the PTO driving shaft, and a second wall having a second hole for supporting the PTO driven shaft, the second wall being spaced apart from the first wall so as to define a first accommodating space to position the PTO clutch unit between the first wall and the second wall.

The PTO clutch unit includes a drive-side member operatively connected to the PTO driving shaft, and an output shaft member operatively connected to the PTO driven shaft.

Each of the PTO driving shaft and the PTO driven shaft is connected to the drive-side member and the output shaft member, respectively, of the PTO clutch unit by inserting the PTO driving shaft through the first hole from the upstream side in the transmission direction of the first wall and inserting the PTO driven shaft through the second hole from the downstream side in the transmission direction of the second wall with the PTO clutch unit positioned in the first accommodating space.

According to this configuration, the PTO driving shaft can be inserted from the upstream side in the transmission direction through the first hole of the first wall and the PTO driven shaft can be inserted from the downstream side in the transmission direction through the second hole of the second wall with the PTO clutch unit positioned in a first accommodating space defined by the first wall and the second wall of the transmission case main body, thereby connecting the PTO clutch unit to the PTO driving shaft and the PTO driven shaft.

Therefore, the attachment work of the PTO clutch unit to the transmission case becomes more efficient.

Preferably, a differential gear unit may be arranged between the first wall and the second wall, and below the PTO clutch unit in the transmission case.

According to this aspect, the dead space of the transmission case can be effectively used.

Preferably, the output shaft member of the PTO clutch unit may include an output shaft arranged coaxially with the PTO driving shaft and connected to the PTO driven shaft in a relatively non-rotatable manner about the axis line and a clutch housing externally inserted to the output shaft in a relatively non-rotatable manner, and is configured so as to form a hydraulic clutch mechanism which selectively performs power transmission/power interruption to the output shaft between the drive-side member and the clutch housing.

Also, an oil path for introducing hydraulic oil to the hydraulic clutch mechanism through an annular groove formed in an outer peripheral surface adjacent the installation portion of the clutch housing may be perforated in the output shaft.

Preferably, the PTO clutch unit may include a hydraulic clutch mechanism for selectively performing power transmission/power interruption from the drive-side member to the output shaft member, and a hydraulic brake mechanism for applying/releasing a braking power to/from said output shaft member when the hydraulic clutch mechanism is in the power interrupting state/the power transmitting state.

The hydraulic brake mechanism may include a brake member which is relatively non-rotatable with respect to said output shaft member when said braking power is applied, and a fixed member for engaging with the brake member to stop the rotation of the brake member.

The fixed member may be detachably and non-rotatably supported at the second wall.

According to this preferably aspect, the hydraulic brake mechanism can be arranged without adding a complicating structure to the transmission case.

More preferably, the brake member is rotatable within an angular range of greater than 0° and smaller than 360° with respect to the fixed member.

For example, the output shaft member includes an output shaft arranged coaxially with the PTO driving shaft and connected to the PTO driven shaft in a relatively non-rotatable manner about the axis line, and a clutch housing externally inserted in a relatively non-rotatable manner to the output shaft.

The hydraulic clutch mechanism further includes a drive-side friction plate supported in a relatively non-rotatable manner at the drive-side member, a driven-side friction plate supported in a relatively non-rotatable manner at the clutch housing, said driven-side friction plate being arranged facing the drive-side friction plate, a piston for frictionally contacting the drive-side friction plate and the driven-side friction plate by the action of the oil pressure, and a biasing member for biasing the piston toward a direction away from the drive-side friction plate and the driven-side friction plate.

The hydraulic brake mechanism includes a driven-side friction plate supported in a relatively non-rotatable manner at the brake member, a drive-side friction plate arranged in a relatively non-rotatable manner at the clutch housing so as to face the driven-side friction plate, and a pressing member connected in a relatively non-movable manner in the axis direction to the piston by way of a coupling rod.

Preferably, the output shaft is internally inserted and supported in a relatively rotatable manner at the fixed member. First and second oil paths for hydraulic oil acting on the piston are perforated in the output shaft and the fixed member, respectively. The first oil path and the second oil path are communicated by way of an annular groove formed at the contacting location of the output shaft and said fixed member.

Preferably, the output shaft and the PTO driven shaft are connected in a relatively non-rotatable manner about the axis line by way of a coupling with respective opposing ends facing each other. A lubricating oil path opened at the end opposing the PTO driven shaft is perforated in the output shaft.

More preferably, the opposing ends of the output shaft and the PTO driven shaft are configured so as to concave-convex engage with each other.

In the above various configurations, preferably, the case main body includes a bottom wall extending along the transmission direction so as to be laid across the first and second walls, and a pair of side walls extending upward from the bottom wall, and has an upstream-side opening at the upstream side in the transmission direction, a downstream-side opening at the downstream side in the transmission direction, and an upper-side opening at the upper portion of between the first wall and the second wall opened. The transmission case further includes an upper lid member for covering the upper-side opening. The PTO clutch unit is configured so as to be inserted into the first accommodating space from the upper-side opening of the case main body.

More preferably, the transmission case further includes a first lid member detachably connected to the case main body so as to close the upstream-side opening to form a second accommodating space between the first lid member and the first wall. The second accommodating space accommodates a speed-change unit for a traveling system transmission mechanism.

Preferably, the transmission case further includes a second lid member detachably connected to the case main body so as to close the downstream-side opening to form a third accommodating space between the second lid member and the second wall. The third accommodating space accommodates a PTO transmission gear train succeeding the PTO driven shaft.

Preferably, a lubricating oil path for supplying lubricating oil in the direction toward the PTO clutch unit by way of said PTO driving shaft is formed in the first wall of said transmission case.

More preferably, an oil sump communicating with the starting end side of the lubricating oil path is formed at a joining surface of the first wall and the upper lid member of the transmission case.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENTS

The preferred embodiments of the present invention will now be described with reference to the accompanying drawings.

The PTO transmission structure according to the present invention is applied to a working vehicle equipped with a PTO system transmission mechanism for selectively drawing the power out from a driving source toward the outside of a vehicle.

Figure 1:
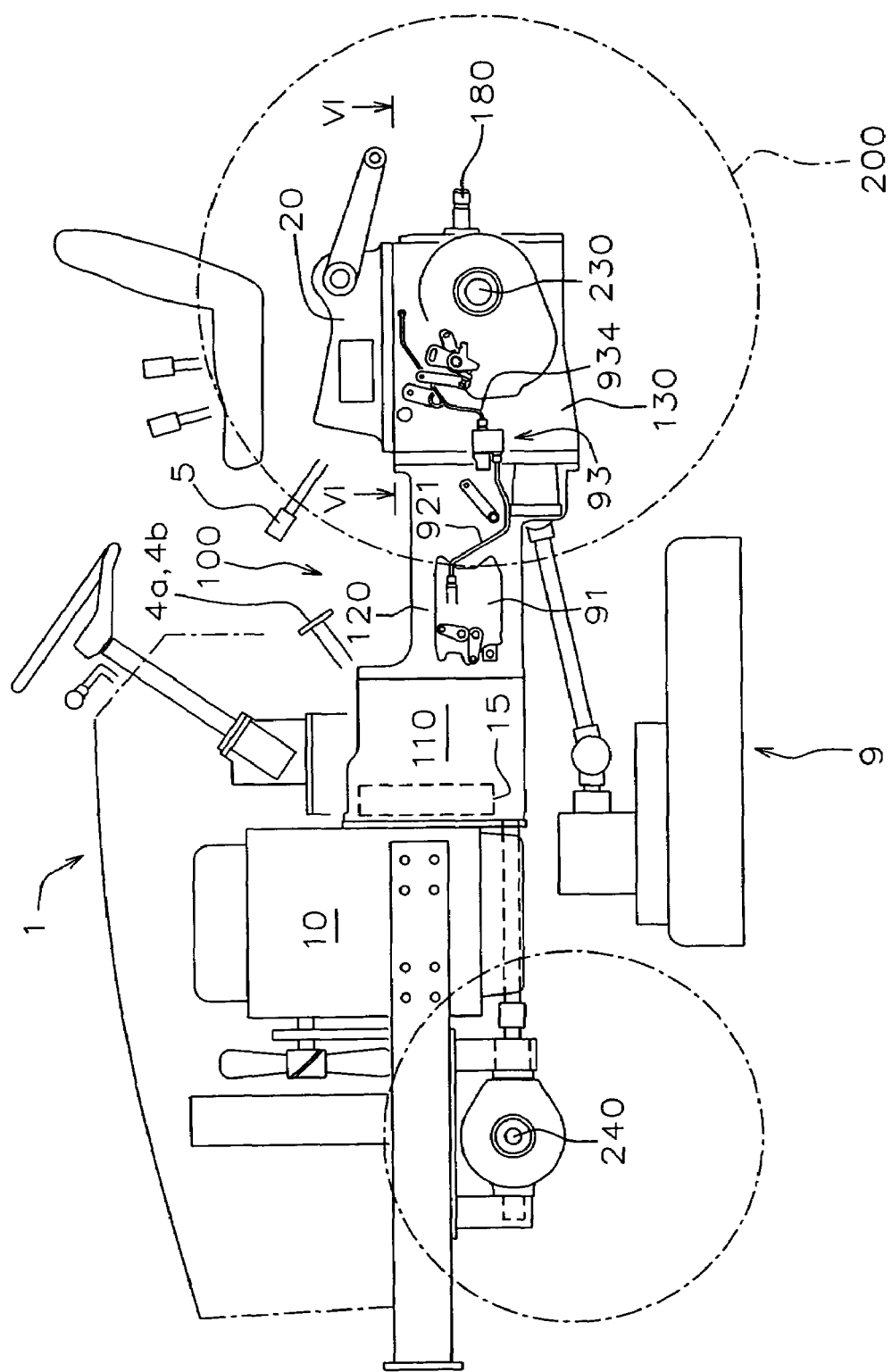
FIG. 1 is a schematic side view of a working vehicle applied with the PTO system transmission mechanism according to a preferred embodiment of the present invention.

FIG. 1 is a schematic side view of a working vehicle 1 applied with the PTO system transmission mechanism according to this embodiment.

The working vehicle 1 comprises a PTO system transmission mechanism applied with the PTO transmission structure according to this embodiment, a traveling system transmission mechanism for transmitting the power from a driving source to a main driving wheel (and/or auxiliary driving wheel), and a housing structure 100 for accommodating the PTO system transmission mechanism and the traveling system transmission mechanism.

The housing structure 100 will first be described.

As shown in FIG. 1, the housing structure 100 constitutes at least a part of a vehicle frame and functions as a strengthening member. The housing structure 100 comprises a flywheel housing 110 connected to an engine 10, an intermediate housing 120 connected to the flywheel housing 110, and a transmission case 130 connected to the intermediate housing 120.

Figure 2:
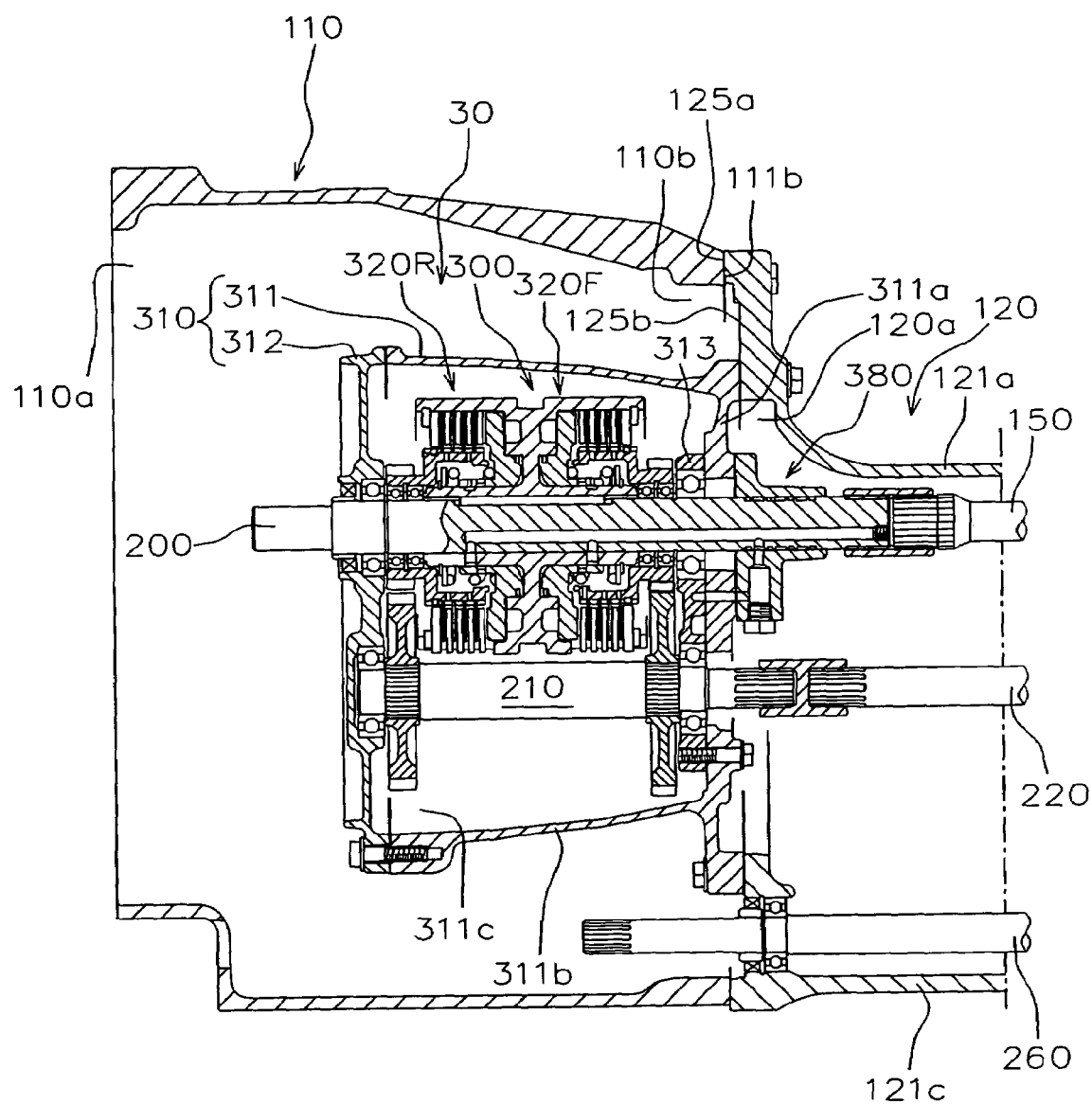
FIG. 2 is a longitudinal side view of a flywheel housing of the working vehicle.
Figure 3:
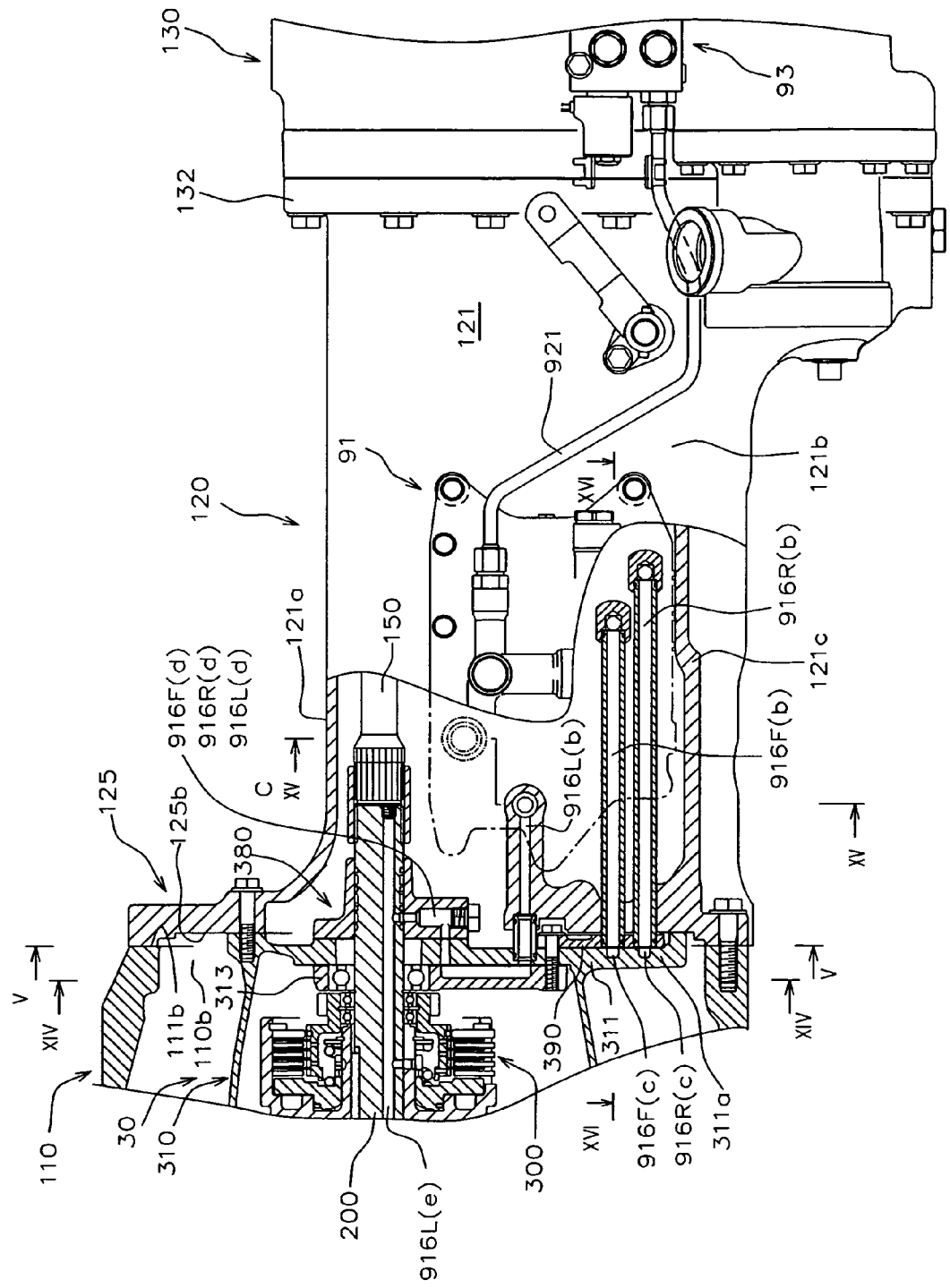
FIG. 3 is a longitudinal side view of a intermediate housing of the working vehicle.
Figure 4:
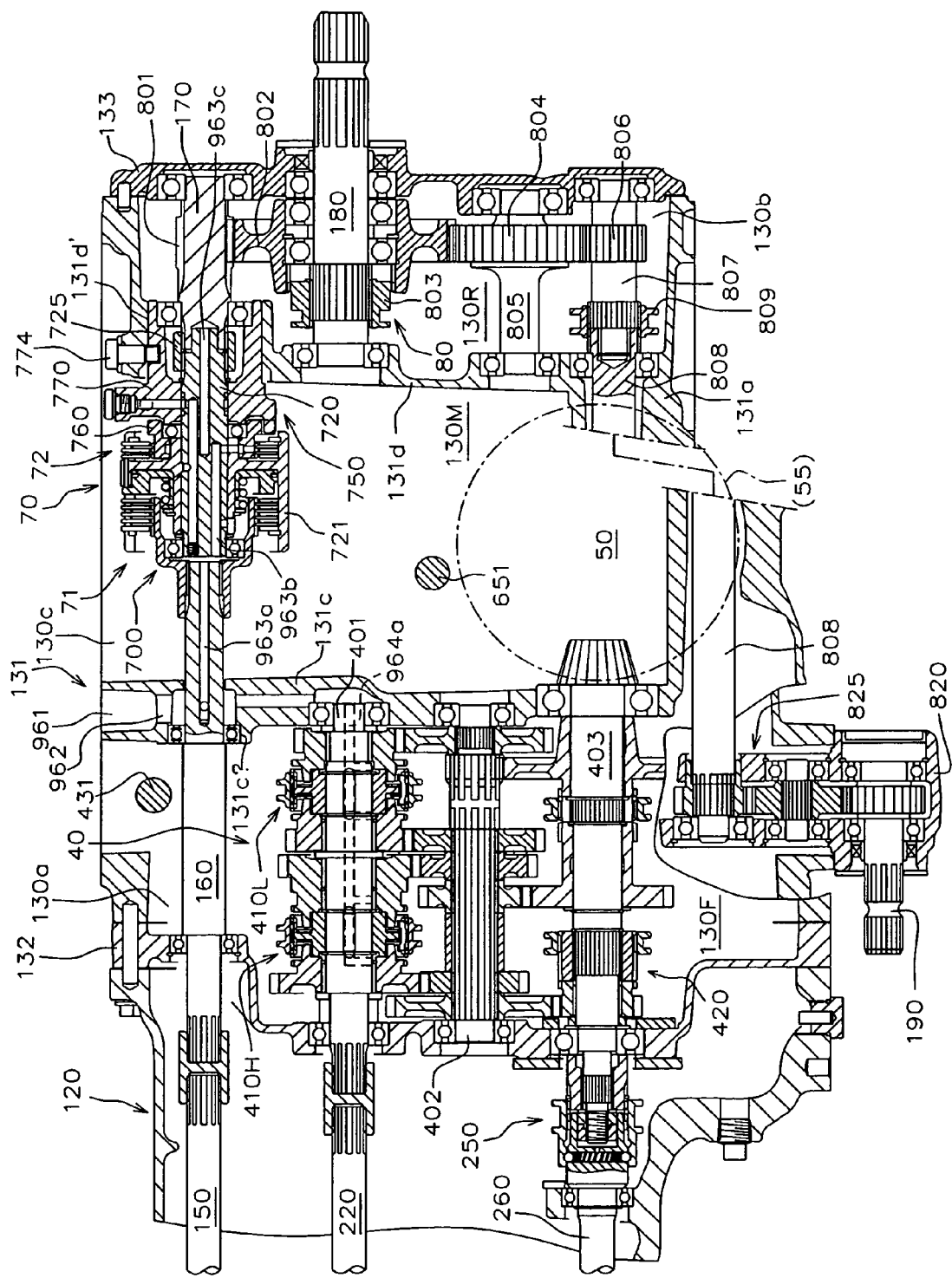
FIG. 4 is a longitudinal side view of a transmission case of the working vehicle.

FIGS. 2 to 4 are longitudinal side views of the flywheel housing 110, the intermediate housing 120 and the transmission case 130, respectively.

The flywheel housing 110 has a hollow shape with a first opening 110a and a second opening 110b on the upstream side and the downstream side, respectively, in the transmission direction.

The first opening 110a is made into a size that allows the flywheel 15 (see FIG. 1) operatively connected to the engine 10 to be inserted.

The second opening 110b is made into a size that allows a forward/rearward movement switching unit 30 (which will be described later) to be inserted.

The flywheel housing 110 has the end on the upstream side in the transmission direction connected to the engine 10 so as to lie along the front-to-rear direction of the vehicle (see FIG. 1).

The vehicle 1 according to this embodiment has the engine 10 arranged at the front in the longitudinal direction of the vehicle and the rear wheel 200 serving as a main driving wheel. Therefore, the upstream side and the downstream side in the transmission direction each refer to the front side and the rear side. In the following description, the upstream side and the downstream side of the transmission direction are stated as the front side and the rear side as appropriate.

As shown in FIG. 3, the intermediate housing 120 comprises a hollow main body 121 extending along the longitudinal direction of the vehicle, and a front flange 125 positioned at the front side of the main body 121.

The front flange 125 provides a connecting region to the flywheel housing 110 and also provides a supporting region for the forward/rearward movement switching unit 30.

Figure 5:
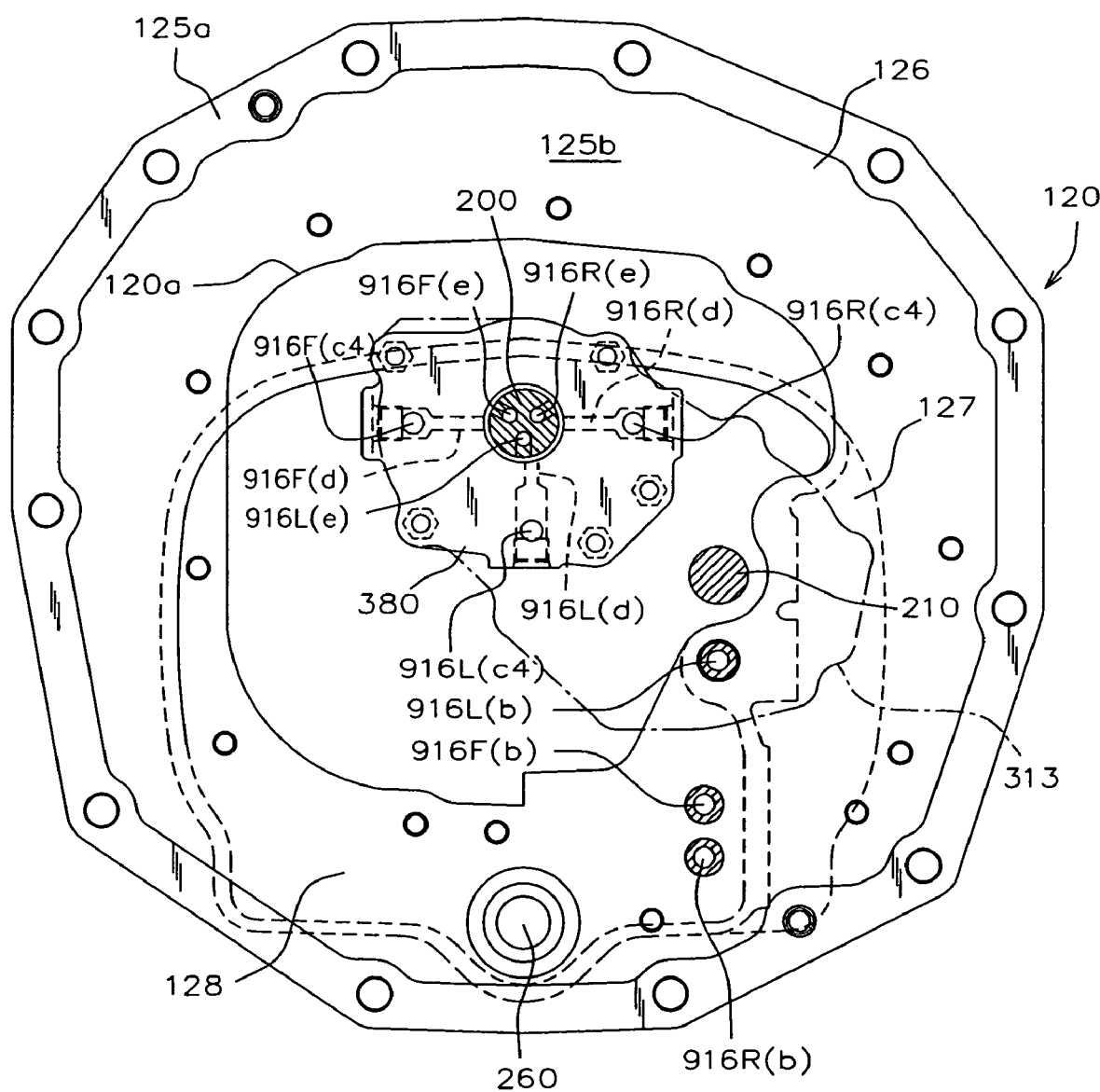
FIG. 5 is a front end view of the intermediate housing with a forward/rearward movement switching unit removed.

FIG. 5 shows a front end view of the intermediate housing 120 with the forward/rearward movement switching unit removed.

As shown in FIG. 5, the front flange 125 includes a contacting surface 125a that forms the connecting region to the flywheel housing 110 at a portion positioned outward in the radial direction of the front end face (end face of the upstream side in the transmission direction).

The contacting surface 125a faces the rear end face 111b (end face of the downstream side in the transmission direction) of the flywheel housing 110.

The front flange 125 further includes a supporting surface 125b, which forms the supporting region for the forward/rearward movement switching unit 30, positioned more toward the inside in the radial direction than the contacting surface 125a at the front end face.

The front flange 125 also includes an opening 120a surrounded by the supporting surface 125b. The opening 120a communicates with the hollow region of the main body 121 and forms the front opening (opening at the upstream side in the transmission direction) of the intermediate housing 120.

The configuration of the transmission case 130 will be described later.

The traveling system transmission mechanism will now be described.

As shown in FIGS. 2 to 4, the traveling transmission mechanism comprises a driving shaft 200 operatively connected to the engine 10 by way of the flywheel 15, a driven shaft 210 arranged substantially parallel to the driving shaft 200, a forward/rearward movement switching unit 30 for performing rotating direction switching and interruption of the power transmission from the driving shaft 200 to the driven shaft 210, a propeller shaft 200 arranged along the front-to-rear direction of the vehicle and connected to the driven shaft 210 in a relatively non-rotatable manner about the axis line, a speed-change unit 40 arranged at the downstream side in the transmission direction of the propeller shaft 220, and a differential gear unit 50 for differential transmitting the output from the speed-change unit 40 to a pair of main driving axles (a pair of rear axles in this embodiment).

As shown in FIGS. 2 and 3, the forward/rearward movement switching unit 30 comprises a reversal unit 300 for switching the transmission direction from the driving shaft 200, arranged along the front-to-rear direction of the vehicle so that the front end is operatively connected to the output portion (not shown) of the flywheel, to the driven shaft 210 arranged parallel to the driving shaft 200, and a reversal housing 310 for accommodating the reversal unit 300 and supporting the driving shaft 200 and the driven shaft 210.

The reversal housing 310 includes a housing main body 311 supported by the supporting surface 125b and a lid body 312 connected to the housing main body 311.

The housing main body 311 has a bowl shape.

More specifically, the housing main body 311 includes an end wall 311a connected to the supporting surface 125b so as to cover the front opening 120a of the intermediate housing 120, and a peripheral wall 311b extending from the peripheral edge of the end wall 311a toward the front, and includes an opening 311c at the front through which the reversal unit 300 can be inserted.

The lid body 312 is connected to the housing main body 311 so as to block the front opening 311c of the housing main body 311.

In this embodiment, the reversal housing 310 divides a space (flywheel accommodating space) for accommodating the flywheel of the interior space of the flywheel housing 110 from the interior space of the intermediate housing 120 in a liquid-tight manner.

That is, the end wall 311a of the housing main body 311 is connected to the supporting surface 125b while covering the front opening 120a of the intermediate housing 120. The housing main body 311 and the lid body 312 then block the interior space of the reversal housing 310 from the flywheel accommodating space in a liquid-tight manner. According to this configuration, the interior spaces of the intermediate housing 120 and the reversal housing 310 act as an oil chamber, and the flywheel accommodating space can be used as a dry chamber.

Here, the oil is able to circulate between the interior space of the intermediate housing 120 and the interior space of the reversal housing 310 by way of the bearing hole and the like provided at the end wall 311a.

The driving shaft 200 and the driven shaft 210 are each supported by the reversal housing 310 so as to be rotatable about the respective axis line.

More specifically, the reversal housing 310, in addition to the above configuration, includes a bearing plate 313 detachably fixed to the front surface of the end wall 311a of the housing main body 311.

The driving shaft 200 and the driven shaft 210 are supported by the lid body 312 and the bearing plate 313 in a rotatable manner about the respective axis line.

The driving shaft 200 has a front end passing through the lid body 312 and extending toward the front so as to operatively connect with the flywheel, and a rear end passing through the bearing plate 313 and the end wall 31a and extending toward the rear so as to connect with a succeeding transmitting member.

The driven shaft 210 has a front end supported by the bearing provided in the lid body 312, and a rear end passing through the bearing plate 313 and the end wall 311a and extending toward the rear so as to connect with a succeeding transmitting member.

In this embodiment, the reversal unit 300 is a hydraulic multiple disk-type friction clutch device.

More specifically, the reversal unit 300 includes a forward movement clutch device 320F and a rearward movement clutch device 320R.

The forward movement clutch device 320F and the rearward movement clutch device 320R are each configured so as to be in a transmitting state when supplied with hydraulic oil and in an interrupted state when the supply of hydraulic oil is stopped.

As described above, in the housing structure 100, the intermediate housing 120 includes, on the front side, the contacting surface 125a that faces the rear end of the flywheel housing 110, the supporting surface 125b inwardly positioned in the radial direction of the contacting surface 125a and supporting the forward/rearward movement switching unit 30, and the opening 120a, surrounded by the supporting surface 125b, the opening 120a being inserted with the transmission shafts (the main shaft 150 and the propeller shaft 220 in this embodiment) succeeded by the driving shaft 200 and the driven shaft 210, respectively.

With this configuration, by connecting the forward/rearward movement switching unit 30 to the supporting surface 125b from the front side of the intermediate housing 120 and, then, connecting the intermediate housing 120 and the flywheel housing 110 by way of the contacting surface 125a, the flywheel housing 110 and the intermediate housing 120 can be easily connected to each other with the forward/rearward movement switching unit 30 accommodated therein, thereby enhancing the assembly efficiency.

Preferably, the contacting surface 125a and the supporting surface 125b are positioned in a front-to-rear direction of the vehicle so that at least a part of the forward/rearward movement switching unit 30 supported by the supporting surface 125b is positioned in the flywheel housing 110 when the flywheel housing 110 and the intermediate housing 120 are connected to each other.

That is, if the supporting surface 125b is arranged greatly spaced apart toward the downstream side (rear side in this embodiment) in the transmission direction from the contacting surface 125a, the forward/rearward movement switching unit 30 completely enters the intermediate housing 120. In this configuration, the distance from the front end of the intermediate housing 120 to the supporting surface 125b becomes long and the attachment workability of the forward/rearward movement switching unit 30 to the supporting surface 125b deteriorates.

If, on the other hand, the positions in the front-to-rear direction of the contacting surface 125a and the supporting surface 125b are set so that at least a part of the forward/rearward movement switching unit 30 supported by the supporting surface 125b is positioned in the flywheel housing 110 as described above, the attachment workability of the forward/rearward movement switching unit 30 to the supporting surface 125b can be improved.

More preferably, as shown in the figures, the positions in the front-to-rear direction of the contacting surface 125a and the supporting surface 125b may be substantially the same, or the supporting surface 125b may be arranged in front of the contacting surface 125a, thereby further improving the attachment workability of the forward/rearward movement switching unit 30.

Further, the housing structure 100 has an effect of securing a free space at above the intermediate housing 120 as much as possible while improving the attachment workability of the forward/rearward movement switching unit 30 and improving the connecting workability of the flywheel housing 110 and the intermediate housing 120.

More specifically, in this embodiment, the forward/rearward movement switching unit 30 is accommodated in the flywheel housing 110, the speed-change unit 40 and the PTO clutch unit 70 (which will be described later) are accommodated in the transmission case 130, and the transmission units such as the speed-change mechanism and the clutch mechanism are not arranged in the intermediate housing 120.

That is, only the transmission shafts such as the main shaft 150 and the propeller shaft 220 connected to the driving shaft 200 and the driven shaft 210, respectively, are accommodated in the intermediate housing 120.

In this configuration, gears, friction plates and the like do not need to be arranged on the transmission shaft such as the main shaft 150; thus, the transmission shaft can be arranged in the vicinity of the wall surface of the intermediate housing.

The housing structure 100 focuses on such points and has the hollow main body 121 configured so that the central axis line thereof is shifted to below the central axis line of the flywheel housing 110 to arrange the top wall 121a of the hollow main body 121 of the intermediate housing in the vicinity of the transmission shaft (main shaft 150 in this embodiment) as much as possible.

The front flange 125 of the intermediate housing 120 is configured so that the lower end position is substantially the same as the hollow main body 121 and the upper end position is positioned above the hollow main body 121 so as to connect the flywheel housing 110 and the hollow main body 121 of the intermediate housing 120 which have central axis lines shifted with respect to each other.

That is, as shown in FIG. 5, the front flange 125 includes an upward extending portion 126 extending from the top wall 121a of the hollow main body 121 outwardly (upward) in the radial direction of the hollow main body 121, a side extending portion 127 extending from the side wall 121b of the hollow main body 121 outwardly and inwardly in the radial direction of the hollow main body 121, and a downward extending portion 128 extending from the bottom wall 121c of the hollow main body 121 inwardly (upwardly) in the radial direction of the hollow main body 121, so as to define the contacting surface 125a arranged facing the rear end 111b of the flywheel housing 110, the supporting surface 125b, positioned toward the inside in the radial direction from the contacting surface 125a, for supporting the forward/rearward movement switching unit 30, and the front opening 120a inwardly positioned in the radial direction of the supporting surface 125b.

As described above, in the housing structure 100, the axis line position of the hollow main body 121 of the intermediate housing 120 is shifted below the axis line position of the flywheel housing 110 to arrange the top wall 121a of the hollow main body 121 as close as possible to the transmission shaft, and the flywheel housing 110 and the hollow main body 121, whose axis line position is shifted below with respect to the flywheel housing 110, are connected to each other by the thus configured front flange 125, on the basis that only the transmission shaft is substantially present in the intermediate housing 120.

In this configuration, the free space can be secured above the hollow main body 121, and the degree of freedom in design of the vehicle is increased.

Particularly, in the case of arranging a step base (see FIG. 1) on the top wall 121a of the hollow main body 121, the above configuration allows the step base to be arranged as low as possible, thereby improving the movement of getting on/off the driver's seat.

The propeller shaft 220 has a the front end side connected to the driven shaft 210 in a relatively non-rotatable manner about the axis line (see FIG. 2) and a rear end side connected to the speed-change unit 40 (see FIG. 4).

Preferably, a rib (not shown) extending inwardly in the radial direction from the inner peripheral surface of the top wall 121a is integrally formed with the hollow main body 121 of the intermediate housing 120, and the central portion of the propeller shaft 200 can be supported by a through hole formed in the rib. With this configuration, in the assembling process the propeller shaft 220 can be temporarily supported at a horizontal state at the rib, thereby facilitating the assembling task.

As shown in FIG. 4, the speed-change unit 40 is accommodated in the transmission case 130.

The configuration of the transmission case 130 will now be described.

Figure 6:
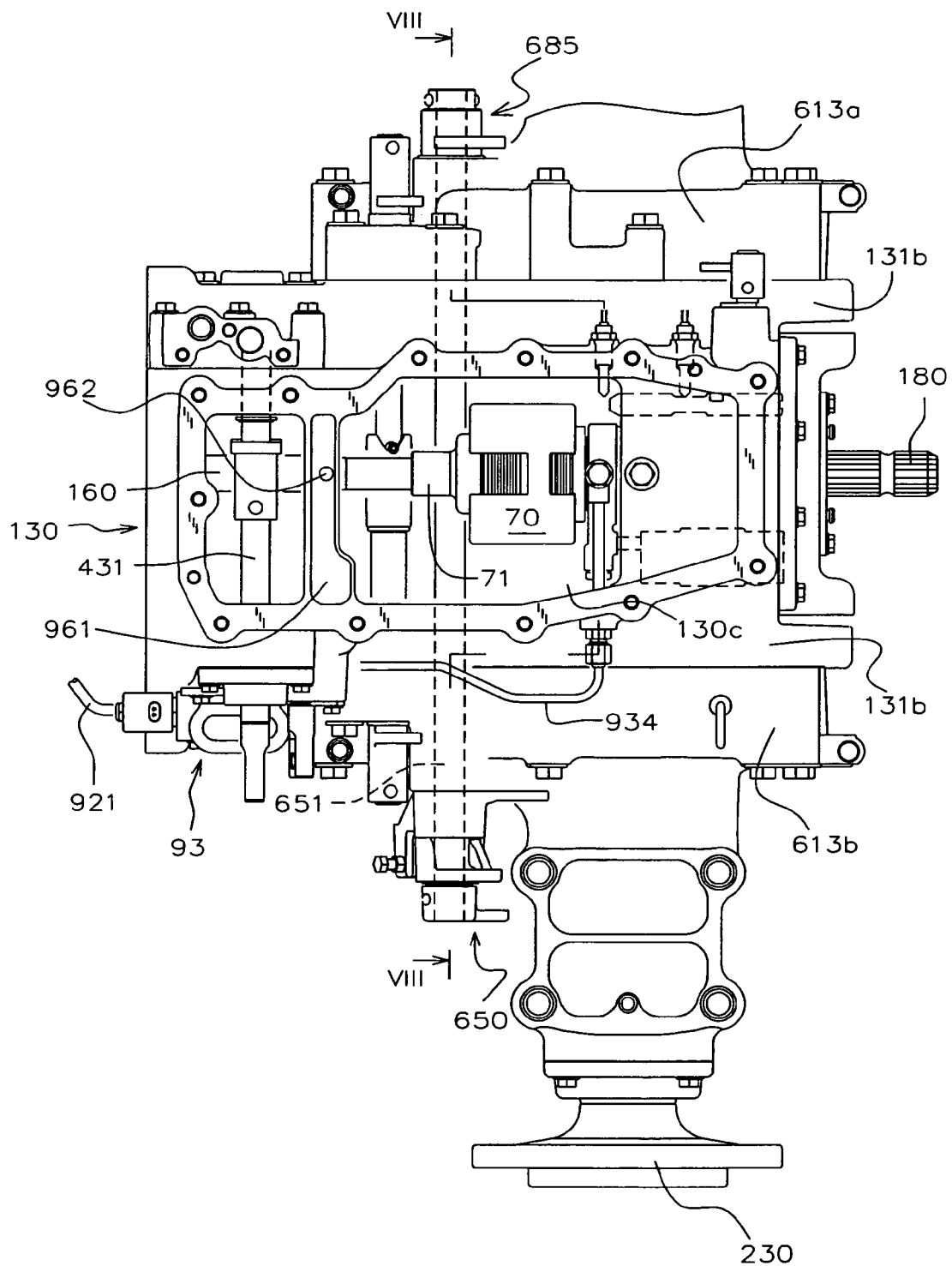
FIG. 6 is a plan view of the transmission case.
Figure 7:
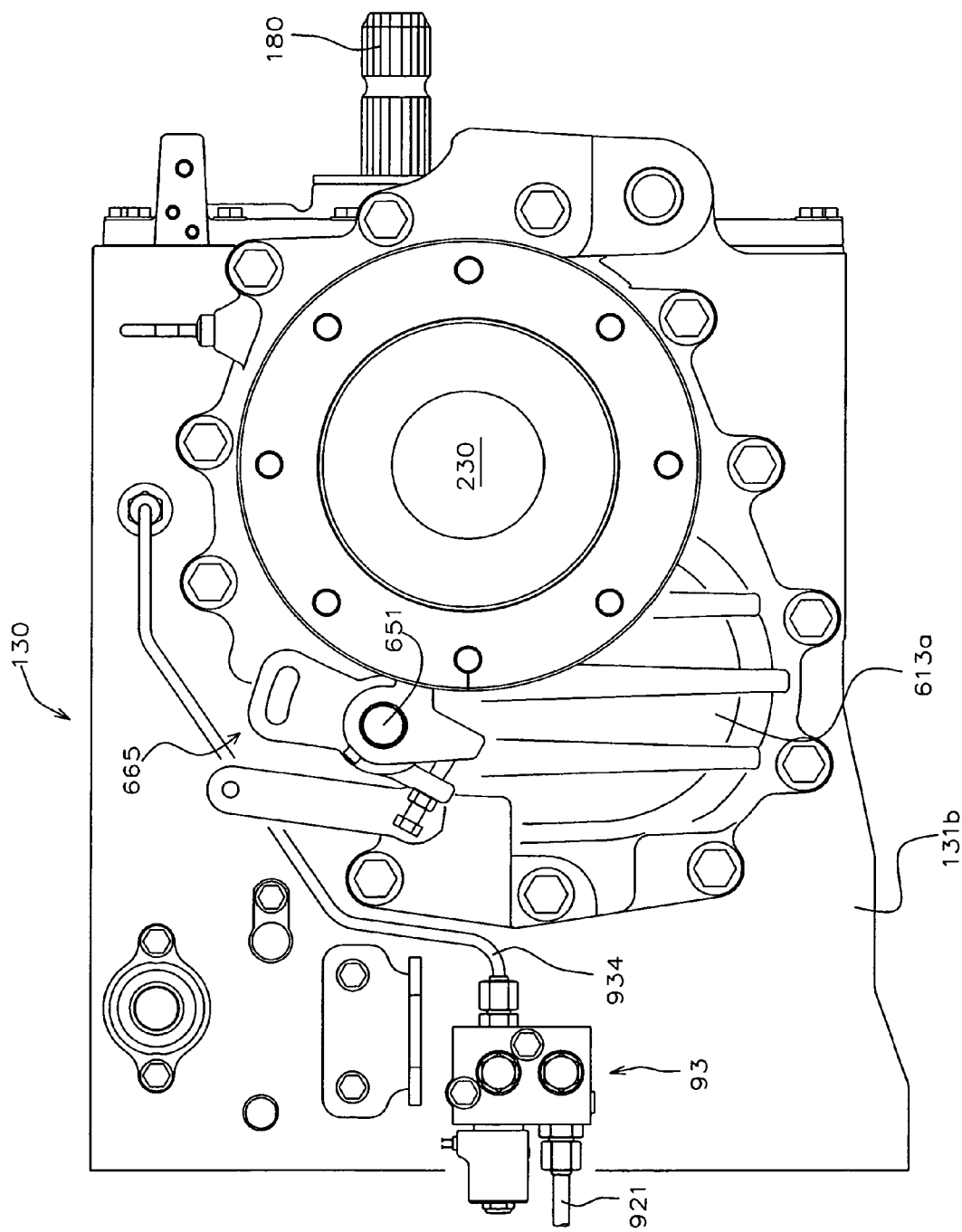
FIG. 7 is a side view of the transmission case.

FIGS. 6 and 7 show a plan view and a side view, respectively, of the transmission case 130. Further, FIG. 8 shows a cross-sectional view taken along line VIII-VIII of FIG. 6.

Figure 8:
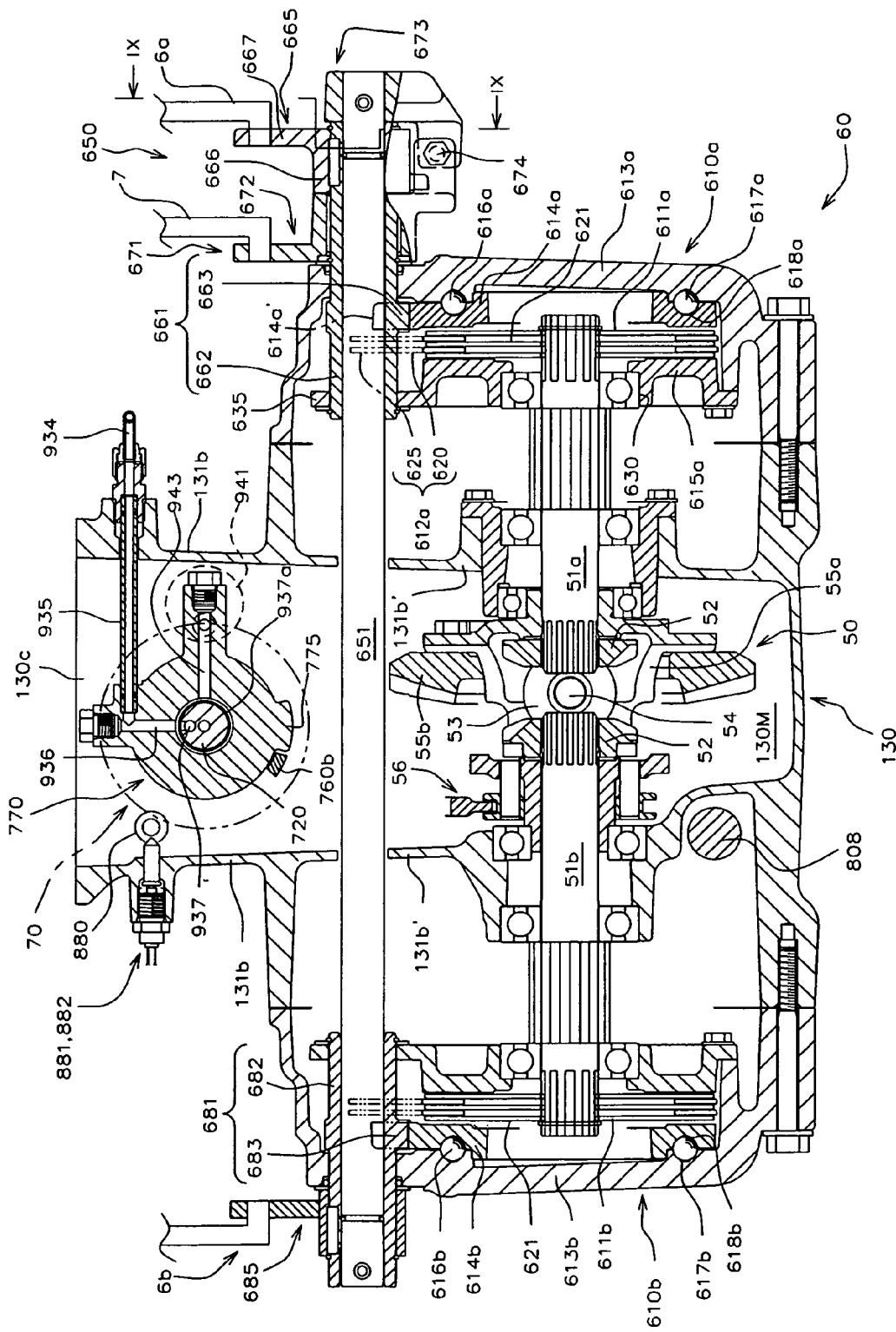
FIG. 8 is a cross-sectional view taken along line VIII-VIII of FIG. 6.

As shown in FIGS. 4 and 8, the transmission case 130 includes a main body 131 comprising a bottom wall 131a extending along the front-to-rear direction of the vehicle, a pair of side walls 131b extending upward from both sides in the width direction of the vehicle of the bottom wall 131a, a first wall 131a extending upward from the inner peripheral surface of the bottom wall 131a so as to separate the interior space defined by the bottom wall 131a and the pair of side walls 131b in the front-to-rear direction of the vehicle, and a second wall 131d extending upward from the inner peripheral surface of the bottom wall 131a so as to separate the interior space in the front-to-rear direction of the vehicle at the rear of the first wall 131c, and defining front and rear openings 130a, 130b at the front end and the rear end, respectively.

The transmission case 130 further includes a first lid member 132 and a second lid member 133 (see FIG. 4) each covering the front opening 130a and the rear opening 130b of the main body 131.

That is, the transmission case 130 has a front chamber 130F, a medium chamber 130M, and a rear chamber 130R each formed between the first wall 131c and the first lid member 132, between the first wall 131c and the second wall 131d, and between the second wall 131d and the second lid member 133.

Here, an opening 130c is formed at the upper portion of the transmission case main body 131, and the upper opening 130c is blocked by a hydraulic lift case 20 (see FIG. 1).

That is, in this embodiment, the hydraulic lift case 20 also acts as an upper lid member for covering the upper opening 130c of the transmission case main body 131.

The speed-change unit 40 is accommodated within the front chamber 130F of the transmission case 130.

That is, the front chamber 130F forms a second accommodating space for accommodating the speed-change unit 40.

More specifically, as better shown in FIG. 4, the speed-change unit 40 comprises a main speed-change shaft 401 connected to the propeller shaft 220 in a relatively non-rotatable manner about the axis line, an intermediate shaft 402 arranged parallel to the main speed-change shaft 401, an auxiliary speed-change shaft 403 arranged parallel to the intermediate shaft 402, main speed-change devices 410L, 410H for performing multi-step speed-change between the main speed-change shaft 401 and the intermediate shaft 402, and an auxiliary speed-change device 420 for performing a multi-step speed-change between the intermediate shaft 402 and the auxiliary speed-change shaft 403.

The main speed-change shaft 401 has a front end supported by the first lid member 132 and a rear end supported by the first wall 131c. The front end of the main speed-change shaft 401 passes through the first lid member 132 and extends toward the front, and the front extending portion is connected to the rear end of the propeller shaft 220 in a relatively non-rotatable manner about the axis line.

The intermediate shaft 402 has each of a front end and a rear end supported by the first lid member 132 and the first wall 131c.

The auxiliary speed-change shaft 403 has a front end supported by the first lid member 132 and a rear end supported by the first wall 131c.

The front end of the auxiliary speed-change shaft 403 passes through the first lid member 132 and extends toward the front, where the front extending portion forms the driving power output portion for the auxiliary driving axle 240 (front axle in this embodiment).

The rear end of the auxiliary speed-change shaft 403 passes through the first wall 131c and extends toward the middle chamber 130M at the rear. Further, the rear end of the auxiliary speed-change shaft 403 includes a bevel pinion, and is operatively connected to the differential gear unit 50 arranged at the bottom of the medium chamber 130M.

In this embodiment, the first and second synchronized meshing devices 410L, 410H each capable of a two stage speed-change transmission are employed as the main speed-change device.

The first and second synchronized meshing devices 410L, 410H rotate the intermediate shaft 402 at a respective rotational speed corresponding to the first speed to the fourth speed based on the external operation.

The reference numeral 431 in FIG. 4 denotes a speed-change shift shaft of the operating device for operating the switch of the speed-change step of the main speed-change devices 410L, 410H.

In this embodiment, a constant mesh-type clutch device capable of a three-step speed-change transmission is employed as the auxiliary speed-change device 420.

The clutch device 420 rotates the auxiliary speed-change shaft 403 at a respective rotational speed corresponding to low speed, medium speed and high speed based on the external operation.

As shown in FIGS. 4 and 8, the differential gear unit 50 is accommodated in the middle chamber 130M of the transmission case 130.

More specifically, as shown in FIG. 8, a portion positioned at the lower portion of the side wall 131b of the transmission case 130 (hereinafter, referred to as lower side wall 131b') is recessed toward the center in the width direction of the vehicle, and the differential gear unit 50 is arranged between the lower side walls 131b'.

That is, as better shown in FIG. 8, the differential gear unit 50 comprises a pair of differential yoke shafts 51 supported by the lower side walls 131b' so that the inner end is inwardly positioned from the middle chamber 130M and the external end is outwardly positioned from the middle chamber 130M, a pair of side bevel gears 52 supported at the inner ends of the pair of differential yoke shafts 51 in a relatively non-rotatable manner, a bevel pinion 53 meshing with the pair of side bevel gears 52, the bevel pinion 53 revolving about the pair of differential yoke shafts 51 and rotating about a pivot shaft 54 orthogonal to the differential yoke shaft 51, a differential housing 55a for supporting the pivot shaft 54 so as to allow the bevel pinion 53 to revolve about the yoke shaft 51 while permitting rotation of the bevel pinion 53 about the pivot shaft 54 and for accommodating the side bevel gears 52 and the bevel pinion 53, and a ring gear 55 connected to the differential housing 55a.

The differential gear unit 50 can differentially transmit the driving power, which is input from the rear end of the auxiliary speed-change shaft 403 to the ring gear 55, to the pair of differential yoke shafts 51.

The pair of differential yoke shafts 51 are each operatively connected to a pair of main driving axles 230 (a pair of rear axles in this embodiment) supported at the pair of side walls 131b of the transmission case by way of a deceleration gear (not shown).

Preferably, a lock mechanism 56 for preventing the bevel pinion 53 from rotating on its own axis and forcibly rotating the pair of differential yoke shafts 51 at the same speed can be provided in the differential gear unit 50.

The traveling system transmission mechanism further comprises a brake mechanism 60 for operatively and selectively applying the braking power to the main driving axle 230.

The brake mechanism 60 is configured so as to apply an individual or integral braking power directly or indirectly to the pair of first and second main driving axles 230 to which the driving power from the driving source is branch transmitted, based on the selective external operation.

In this embodiment, the brake mechanism 60 is configured so as to apply an individual or integral braking power to the pair of first and second differential yoke shafts 51a, 51b in the differential gear unit 50, based on the selective external operation.

More specifically, as shown in FIG. 8, the brake mechanism 60 comprises first and second brake units 610a, 610b each applying the braking power to the first and second differential yoke shafts 51a, 51b, respectively, and a brake operating unit 650 for selectively independently operating or integrally operating the first and second brake units 610a, 610b, based on the external operation.

In this embodiment, the first and second brake units 610a, 610b and the brake operating unit 650 are attached to the transmission case 130.

The first brake unit 610a includes a first drive-side brake disk 611a which is movable in the axis line direction and relatively non-rotatable with respect to the first differential yoke shaft 51a, a first fixed-side brake disk 612a which is movable in the axis line direction with respect to the first differential yoke shaft 51a, a first brake cover 613a which is connected to one side wall 131b of the transmission case 130 so as to cover the first drive-side and the first fixed-side brake disks 611a, 612a and forms a part of an axle housing of the main drive axle 230, a first brake actuator 614a arranged between the first brake disk group consisting of the first drive-side and the fixed-side brake disks 611a, 612a and the inner peripheral surface of the first brake cover 613a in a rotatable manner about the first differential yoke shaft 51a, and a stopping member 615a, positioned on the other side of the first brake actuator 614a with the brake disk group in between, that defines the movement terminating end position in the axis line direction of the first brake disk group pressed by the first brake actuator 614a.

The first fixed-side brake disk 612a is arranged so as to face the first drive-side brake disk 611a, and frictionally contacts with the first drive-side brake disk 611a in accordance with the actuation of the first brake actuator 614a.

That is, the first fixed-side brake disk 612a is freely movable in the axis line direction but is non-rotatable with respect to the first differential yoke shaft 51a.

The configuration for having the first fixed-side brake disk 612a to be non-rotatable with respect to the first differential yoke shaft 51a will be described later.

The first brake actuator 614a presses the first brake disk group so that the first drive-side and first fixed-side brake disks 611a, 612a frictionally contact with respect to each other in accordance with its own rotational movement.

More specifically, the first brake unit 610a further includes a cam ball 616a inserted between the first brake actuator 614a and the first brake cover 613a.

The cam ball 616a is inserted in a holding recess 617a formed at one of the opposing surfaces (the inner surface of the first brake cover 613a in this embodiment) of the first brake actuator 614a and the first brake cover 613a.

Further, an inclined groove 618a, to which the cam ball 616a is inserted, is formed at the other opposing surface (the outer surface of the first brake actuator 614a in this embodiment) of the first brake actuator 614a and the first brake cover.

The inclined groove 618a includes a deepest portion and an inclined portion in which the depth shallows from the deepest portion in the direction of the circumference.

With this configuration, when the first brake actuator 614a is rotated about its own axis, the first brake actuator 614a moves inwardly in the axis line direction of the first differential yoke shaft 51a by way of the cam ball 616a so as to press the first brake disk group.

The configuration for rotating the first actuator 614 about its own axis will be described later.

The stopping member 615a is a plate member including a central hole to bearing support the first differential yoke shaft 51a.

The stopping member 615a is connected with either the transmission case 130 or the first brake cover 613a (first brake cover 613a in this embodiment).

The brake unit 610b has substantially the same configuration as the first brake unit 610a. Therefore, the detailed description of the second brake unit 610b will not be given herein. In the figure, the members corresponding to those in the first brake unit 610a are denoted with the same reference characters but with the subscript changed to "b".

The brake operating unit 650 comprises a brake operating shaft 651 arranged substantially parallel to the first and second differential yoke shafts 51a, 51b, a first actuating member 661 externally inserted in a relatively rotatable manner to the first side of the brake operation shaft 651 facing the first brake unit 610a, a first brake connecting member 665 supported at the first actuating member 661 in a relatively non-rotatable manner, a common brake connecting member 671 which is relatively non-rotatable with respect to the brake operating shaft 651, a second actuating member 681 externally inserted in a relatively non-rotatable manner to the second side of the brake operation shaft 651 facing the second brake unit 610b, and a second brake connecting member 685 supported in a relatively non-rotatable manner at the second actuating member 681.

The brake operating shaft 651 is supported with both ends extending outward to allow the first brake connecting member 665, the common brake connecting member 671, and the second brake connecting member 685 to be externally operated.

In this embodiment, the brake operating shaft 651 is supported by the first and second brake covers 613a, 613b so that both ends extend outwardly, and the first brake connecting member 665, the common brake connecting member 671, and the second brake connecting member 685 are positioned at the outwardly extending portion.

The first actuating member 661 is operatively connected to the corresponding first brake actuator 614a. That is, when the first actuating member 661 rotates about the axis line of the brake operating shaft 651, the first brake actuator 614a rotates about the axis line of the first differential yoke shaft 51a.

In this embodiment, the first actuating member 661 includes a tube portion 662 inserted exterior to the brake operating shaft 651, and a cam portion 663 extending outwardly in the radial direction from the tube portion 662.

The first actuator 614a includes a driven portion 614a' which engages with the cam portion 663 of the corresponding first actuating member 661.

With this configuration, when the first actuating member 661 is rotated about the axis line of the brake operating shaft 651, the first brake actuator 614a rotates about the first differential yoke shaft 51a on its own axis, thereby pressing the first brake actuator 614a inward in the axis line direction of the first differential yoke shaft 51a.

Similarly, the second actuating member 681 includes a tube portion 682 supported in a relatively non-rotatable manner at the brake operating shaft 651, and a cam portion 683 extending outwardly in the radial direction from the tube portion 682.

The second actuating member 681 is operatively connected to the corresponding second brake actuator 614b by way of the cam portion 683.

Figure 9:
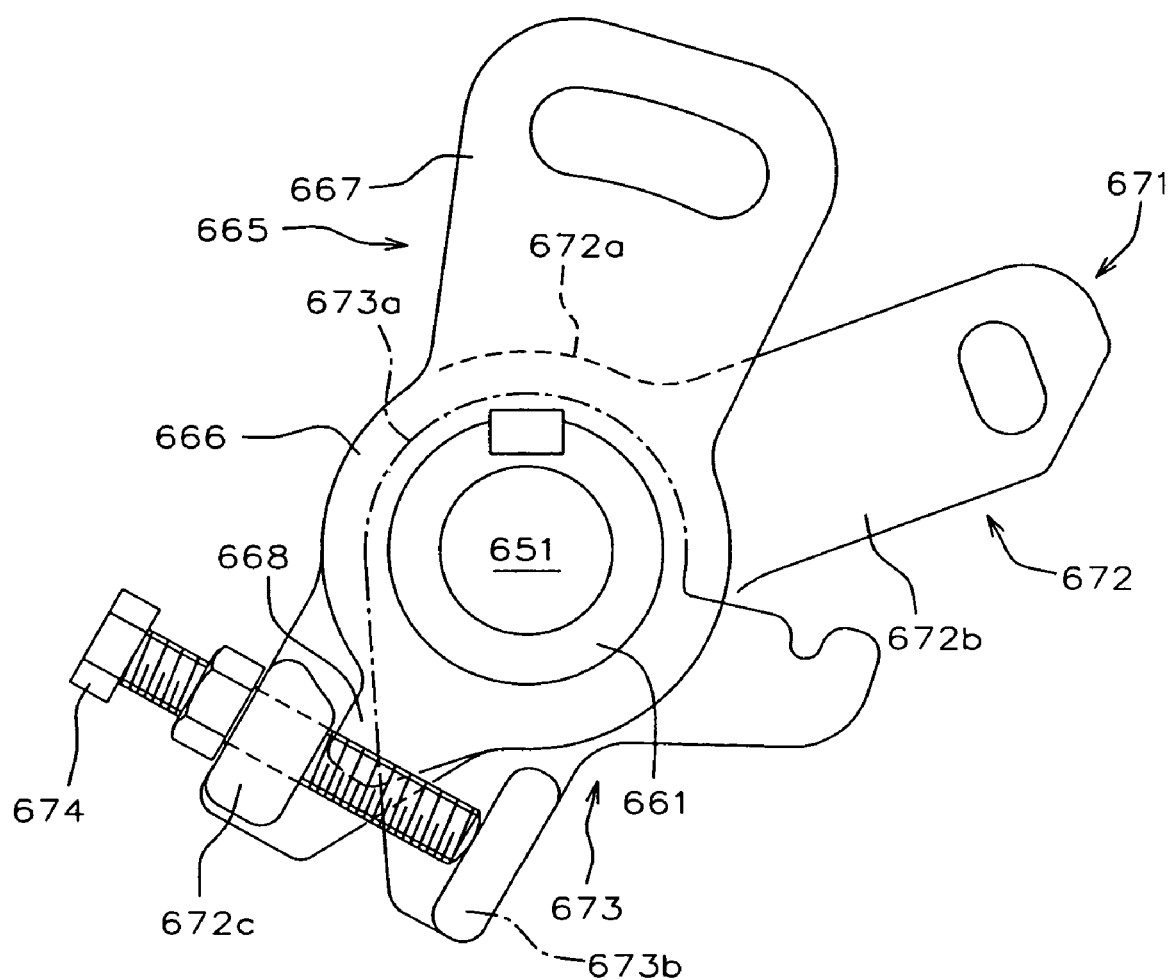
FIG. 9 is a cross sectional view taken along line IX-IX of FIG. 8.

FIG. 9 shows a cross sectional view taken along line IX-IX of FIG. 8.

The first and second brake connecting members 665, 685 are each operatively connected to the first and second brake operating members 4a, 4b such as a pedal arranged in the vicinity of the driver's seat by way of the first and second link mechanisms 6a, 6b.

More specifically, as shown in FIGS. 8 and 9, the first brake connecting member 665 comprises a tubular main body 666 externally inserted in a relatively non-rotatable manner to the first actuating member 661, and a first link mechanism connecting portion 667 extending outwardly in the radial direction from the tubular main body 666, the first link mechanism connecting portion 667 being connected with a part of the first link mechanism 6a.

Similarly, the second brake connecting member 685 includes a tubular main body externally inserted in a relatively non-rotatable manner to the second actuating member 681, and a second link mechanism connecting portion extending outwardly in the radial direction from the tubular main body, the second link mechanism connecting portion being connected with a part of the second link mechanism 6b.

With this configuration, when the driver operates the first brake operating member 4a, the first brake connecting member 665 rotates the first actuating member 661 about the axis line of the brake operating shaft 651; thus, the first brake unit 610a is in the actuating state alone.

Similarly, when the driver operates the second brake operating member 4b, the second brake connecting member 685 rotates the second actuating member 681 about the axis line of the brake operating shaft 651; thus, the second brake unit 610b is in the actuating state alone.

The common brake connecting member 671 is operatively connected to a common brake operating member 5 such as a parking lever arranged in the vicinity of the driver's seat by way of the common link mechanism 7, and is configured so as to rotate both the first actuating member 661 and the brake operating shaft 651 about the axis line of the brake operating shaft 651 in accordance with the operation of the common brake operating member 5.

More specifically, as shown FIGS. 8 and 9, the common brake connecting member 671 comprises a pressing member 672 externally inserted in a relatively rotatable manner to the first actuating member 661, a driven member 673 externally inserted in a relatively non-rotatable manner to the brake operating shaft 651, and a connecting member 674 for connecting both of the above so as to rotate the driven member 673 in conjunction with the rotation of the pressing member 672.

The pressing member 672 comprises a main body 672a supported at the first actuating member 661 in a relatively rotatable manner, a common link mechanism connecting part 672b extending outwardly in the radial direction from the main body 672a, the common link mechanism connecting part 672b being connected with a part of the common link mechanism 7, and a pressing portion 672c extending outwardly in the radial direction from the main body 672a.

The pressing portion 672c is configured so as to engage with the first brake connecting member 665 and to rotate the first brake connecting member 665 about the axis line of the brake operating shaft 651.

More specifically, the first brake connecting member 665 includes, in addition to the above configuration, an engaging portion 668 extending outwardly in the radial direction from the tubular main body 666, the engaging portion 668 being configured so as to engage with the pressing portion 672c.

The pressing portion 672c of the common brake connecting member 671 and the engaging portion 668 of the first brake connecting member 665 are engaged with each other so that the first brake connecting member 665 is turned in the brake actuating direction when the common connecting member 671 is rotated toward one side (brake actuating direction) in the circumferential direction with respect to the axis line of the brake operation shaft 651.

That is, when the common brake connecting member 671 is rotated toward the brake actuating direction, the first brake connecting member 665 is rotated toward the brake actuating direction; thus, the first actuating member 661 is rotated toward the brake actuating direction.

The driven member 673 comprises a main body 673a supported in a relatively non-rotatable manner at the brake operating shaft 651, and a driven portion 673b extending outwardly in the radial direction from the main body 673a.

The driven portion 673b is engaged with the pressing portion 672c of the pressing member 672 by way of the connecting member 674.

That is, the connecting member 674 is fixed to the pressing portion 672c of the pressing member 672. The connecting member 674 has a free end engaged with the driven portion 673b of the driven member 673.

With this configuration, when the pressing member 672 is rotated to one side (brake actuating direction) in the circumferential direction with respect to the axis line of the brake operating shaft 651, the driven member 673 is also turned toward the brake actuating direction; thus, the brake operating shaft 651 is rotated toward the brake actuating direction about the axis line.

In this embodiment, when the common brake connecting member 671 is rotated toward the brake actuating direction, both the brake operating shaft 651 and the first brake connecting member 661 are turned toward the brake actuating direction in accordance therewith; thus, both the first and second brake units 610a, 610b are in the brake actuating state.

More preferably, the position in the circumferential direction of the pressing member 672 with respect to the first brake connecting member 665 with the axis line of the brake operating shaft 651 as the reference is adjustable; thus, the actuation timing of the first brake unit 610a and the second brake unit 610b at the time when the common brake operating member 5 is operated is adjustable.

More specifically, the connecting member 674 is fixed with respect to the pressing portion 672c of the pressing member 672 with the position in the axis line direction being adjustable, and the driven member 673 is biased toward the other side (brake releasing direction) in the circumferential direction with the axis line of the brake operating shaft 651 as the reference.

With this configuration, the relative position of the pressing member 672 and the first brake connecting member 665 at the initial state in which the common brake operating member 5 is not operated is adjustable; thus, the actuation timing of the first brake unit 610a and the second brake unit 610b can be adjusted.

Preferably, as shown in FIG. 8, the first and second fixed-side brake disks 612a, 612b may comprise a disk portion 620 including a central hole 621 provided at the center in the radial direction, and an extending strip 625 extending outwardly in the radial direction from the disk portion 620.

The central hole 621 is formed into a size that allows the corresponding differential yoke shafts 51a, 51b to be inserted therethrough in a relatively rotatable manner. A cut-out or an opening to which the corresponding actuating members 661, 681 are inserted are provided in the extending strip 625.

With this configuration, the first and second fixed-side brake disks 612a, 612b are reliably non-rotatable while having the first and the second fixed-side brake disk 612a, 612b movable in the axis line direction with respect to the corresponding differential yoke shafts 51a, 51b.

More preferably, as shown in FIG. 8, the stopping members 615a, 615b in the first and second brake units 610a, 610b include a central hole 630 to bearing support the corresponding differential yoke shafts 51a, 51b, and a hole or a cut-out 635 to bearing support the corresponding actuating members 661, 681, and the stopping members 615a, 615b can be connected and fixed to the transmission case 130 or the corresponding brake covers 613a, 613b.

According to this configuration, the first and second actuating members 661, 681 are double-lever supported by both of the corresponding brake covers 613a, 613b and the corresponding stopping members 615a, 615b. Therefore, along with the first and second actuating members 661, 681, the brake operating shaft 651 internally inserted to these actuating members 661, 681 can be stably supported.

In this embodiment, since the friction plate-type brake unit is employed as the brake unit 610, the brake actuators 614a, 614b operatively connected to the actuating members 661, 681 are configured so as to move in the axis line direction of the corresponding differential yoke shafts 51a, 51b in accordance with its rotational movement, but the brake mechanism is not limited thereto.

That is, a brake unit of various configurations such as a drum-type brake unit may be employed in place of the friction plate-type brake unit as the brake mechanism. For example, when the drum-type brake unit is employed as the brake unit, the brake actuator operatively connected to the actuating member is configured so as to apply the braking power to the corresponding brake drum in accordance with its own rotational movement.

In this embodiment, the traveling system transmission mechanism further comprises an auxiliary driving axle power drawing unit 250 (see FIG. 4) for outputting the driving power to the auxiliary driving axle 240 (front axle in this embodiment) shown in FIG. 1.

The auxiliary driving axle power drawing unit 250, as shown in FIG. 4, is configured so as to selectively transmit/interrupt the rotating power of the auxiliary speed-change shaft 403 to the auxiliary axle driving shaft 260 arranged concentrically therewith.

The PTO system transmission mechanism will now be described.

As shown in FIGS. 2 to 4, the PTO system transmission mechanism comprises the driving shaft 200, a main shaft 150 connected concentrically to the downstream end in the transmission direction of the driving shaft 200 in a relatively non-rotatable manner about the axis line, a PTO driving shaft 160 connected concentrically to the downstream end in the transmission direction of the main shaft 150 in a relatively non-rotatable manner about the axis line, a PTO driven shaft 170 arranged concentrically with the downstream side in the transmission direction of the PTO driving shaft 160, and a PTO clutch unit 70 for selectively performing power transmission/power interruption from the PTO driving shaft 160 to the PTO driven shaft 170.

The main shaft 150 extends within the upper position of the intermediate housing 120 so as to lie along the front-to-rear direction of the vehicle.

Preferably, a rib (not shown) extending inwardly in the radial direction from the inner peripheral surface of the top wall 121a is integrally formed with the hollow main body 121 in the intermediate housing 120; thus, in assembling process, the main shaft 150 is temporarily supported in a horizontal state at the rib, thereby facilitating the assembling task.

The PTO driving shaft 160, as shown in FIG. 4, is supported in a rotatable manner by the first lid member 132 and the first wall 131c so that the upstream end in the transmission direction reaches the inside of the intermediate housing 120, and the downstream end in the transmission direction reaches the middle chamber 130M of the transmission case 130.

That is, a first hole 131c' for supporting the PTO driving shaft 160 is formed in the first wall 131c of the transmission case main body 131. By inserting the PTO driving shaft 160 through the first hole 131c' from the upstream side in the transmission direction, the PTO driving shaft 160 is supported by the first wall 131c with the downstream end in the transmission direction positioned in the middle chamber 130M.

The PTO driven shaft 170, as shown in FIG. 4, is supported in a rotatable manner on its axis line by the second wall 131d and the second lid member 133 so that the upstream end in the transmission direction reaches the middle chamber 130M of the transmission case 130, and the downstream end in the transmission direction reaches the rear chamber 130R of the transmission case 130.

That is, a second hole 131d' for supporting the PTO driven shaft 170 is formed in the second wall 131d of the transmission case main body 131. By inserting the PTO driven shaft 170 through the second hole 131d' from the downstream side in the transmission direction, the PTO driven shaft 170 is supported by the second wall 131d with the upstream end in the transmission direction positioned in the middle chamber 130M.

The PTO clutch unit 70 is positioned at the upper portion in the middle chamber 130M of the transmission case 130, and at the opposing portion of the PTO driving shaft 160 and the PTO driven shaft 170.

More specifically, the PTO clutch unit 70 includes a drive-side member 71 connected to the PTO driving shaft 160 in a relatively non-rotatable manner, and an output shaft member 72 connected to the PTO driven shaft 170 in a relatively non-rotatable manner, and is configured so as to selectively engage/interrupt the power transmission from the drive-side member 71 to the output shaft member 72.

In this embodiment, the PTO clutch unit 70 is accommodated at the upper space of the differential gear unit 50 arranged at the bottom of the middle chamber 130M of the transmission case 130.

That is, the first wall 131c and the second wall 131d of the transmission case main body 131 are spaced apart from each other so that the PTO clutch unit 70 is positioned in between, and the middle chamber 130M defined by the first wall 131c and the second veering wall 131d acts as a first accommodating space for accommodating the PTO clutch unit 70.

In this embodiment, an opening 130c is formed at the upper wall of the transmission case main body 131, and the size of the opening 130c is set so that the PTO clutch unit 70 can be inserted/extracted through the opening 130c to/from the middle chamber 130M; however, of course, the opening may be provided on the side wall of the transmission case main body 131, and the PTO clutch unit 70 may be inserted/extracted with respect to/from the middle chamber 130M from the side.

In this configuration, by inserting the PTO driving shaft 160 through the first hole 131c' from the upstream side in the transmission direction of the first wall 131c (from the front chamber 130F), and inserting the PTO driven shaft 170 through the second hole 131d' from the downstream side in the transmission direction of the second wall 131d (from the rear chamber 130R) with the PTO clutch unit 70 positioned in the first accommodating space, the PTO driving shaft 160 and the PTO driven shaft 170 can be connected to the drive-side member 71 and the output shaft member 72 of the PTO clutch unit 70, respectively; thus, the attachment work efficiency of the PTO clutch unit 70 to the transmission case 130 can be improved.

That is, conventionally, the PTO clutch unit is supported by the wall integrally formed with the transmission case main body and the lid member detachably connected to the transmission case main body.

In this conventional configuration, the lid member must be connected to the transmission case main body with the PTO clutch unit and the PTO driven shaft, connected to the PTO clutch unit, engaged with the lid member; therefore, the assembling task is troublesome. Further, a wasted space is created at the upper space of the differential gear unit.

On the contrary, in this embodiment, by inserting the PTO driving shaft 160 through the first hole 131c' from the upstream side in the transmission direction of the first wall 131c, and inserting the PTO driven shaft 170 through the second hole 131d' from the downstream side in the transmission direction of the second wall 131d with the PTO clutch unit 70 positioned in the middle chamber 130M, the PTO driving shaft 160 and the PTO driven shaft 170 can be connected to the drive-side member 71 and the output shaft member 72 of the PTO clutch unit 70, respectively.

Further, since the PTO clutch unit 70 is arranged at a position where a relatively wasted space is likely to be created at an upper portion of the differential gear unit 50 sandwiched between the first wall 131c and the second wall 131d, and since the PTO clutch unit 70 can be inserted into/extracted from between the first wall 131c and the second wall 131d, a large hole does not need to be provided in each walls 131c, 131d of the transmission case 130 to insert/extract the PTO clutch unit 70, and the assembly becomes satisfactory while still maintaining the rigidity.

Further, a step of supporting the PTO driving shaft 160 and the PTO driven shaft 170 each by the first wall 131c and the second wall 131d, a step of connecting the PTO driving shaft 160 and the PTO driven shaft 170 to the PTO clutch unit 70, and a step of connecting the second lid member 133 to the transmission case main body 131 do not need to be simultaneously performed; thus, the attachment work of the PTO clutch unit 70 becomes more efficient.

Further, only the PTO clutch unit 70 can be easily detached, and thus maintenance becomes more efficient.

Figure 10:
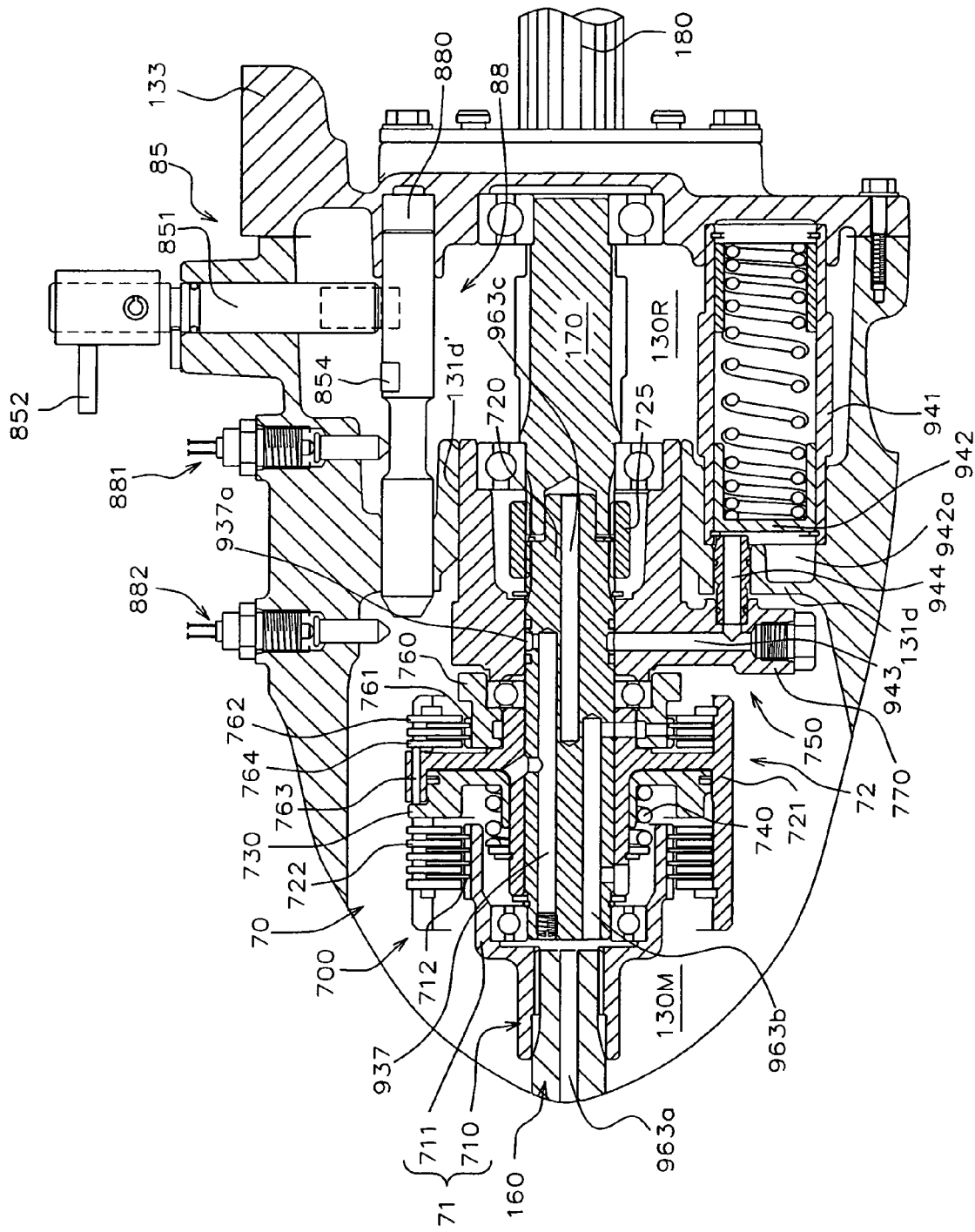
FIG. 10 is a partial cross sectional plan view of the vicinity of a PTO clutch unit of the working vehicle.

FIG. 10 shows a partial cross sectional plan view of the vicinity of the PTO clutch unit 70.

In this embodiment, as shown in FIGS. 4 and 10, the PTO clutch unit 70 includes a frictional multiple disk-type hydraulic clutch mechanism 700.

More specifically, the hydraulic clutch mechanism 700 includes an output shaft 720 and a clutch housing 721, both acting as the output shaft member 72.

The output shaft 720 is configured so as to be concentrically connected to the upstream end of the PTO driven shaft 170 in the transmission direction in a detachable and relatively non-rotatable manner. The clutch housing 721 is configured so as to be externally inserted to the output shaft 720 in a relatively non-rotatable manner.

Further, in the hydraulic clutch mechanism 700, the drive-side member 71 comprises a shaft portion 710 concentrically connected to the downstream end in the transmission direction of the PTO driving shaft 160 in a detachable and relatively non-rotatable manner, and a flange 711 integrally provided with the shaft portion 710 so as to surround a part of the output shaft 720.

Moreover, the hydraulic clutch mechanism 700 comprises a drive-side friction plate 712 supported in a relatively non-rotatable manner and in a movable manner in the axis line direction to the flange 711 of the drive-side member 71, a driven-side friction plate 722 supported in a relatively non-rotatable manner and in a moving manner in the axis line direction to the clutch housing 721 of the output shaft member 72 so as to be arranged opposite the drive-side friction plate 712, a clutch piston 730 for friction contacting the drive-side friction plate 712 and the driven-side friction plate 722 by the act of hydraulic pressure, and a spring 740 for biasing the clutch piston 730 in the direction away from the drive-side friction plate 712 and the driven-side friction plate 722.

In this embodiment, the PTO clutch unit 70 includes an hydraulic brake mechanism 750 for applying/releasing the braking power to/from the output shaft member 72 when the hydraulic clutch mechanism is in the power interrupting state/the power transmitting state.

The hydraulic brake mechanism 750 includes a brake member 760 arranged on the opposite side of the piston 730 with a partitioning wall of the clutch housing 721 in between, the brake mechanism 760 being relatively non-rotatable with respect to the output shaft member 72 by way of the clutch housing 721 when braking power is applied, and a fixed member 770 for engaging with the brake member 760 so as to stop the rotation of the brake member 760.

More specifically, the hydraulic brake mechanism 750 further includes a driven-side friction plate 761 supported by the brake member 760 in a relatively non-rotatable manner, a drive-side friction plate 762 arranged in the clutch housing 721 in a relatively non-rotatable manner so as to face the driven-side friction plate 761, and a pressing member 764 connected to the piston 730 in a relatively non-movable manner in the axial direction by way of a coupling rod 763.

The hydraulic brake mechanism 750 of this configuration acts so that the pressing member 764 is separated away from both friction plates 761, 762 of the hydraulic brake mechanism 750 when the clutch piston 730 frictionally contacts both friction plates 712, 722 of the hydraulic clutch mechanism 700 against the biasing force of the spring 740, and so that the pressing member 764 frictionally engages both friction plates 761, 762 of the hydraulic brake mechanism 750 when the clutch piston 730 is separated away from both friction plates 712, 722 of the hydraulic clutch mechanism 700 by the biasing force of the spring 740.

Figure 11:
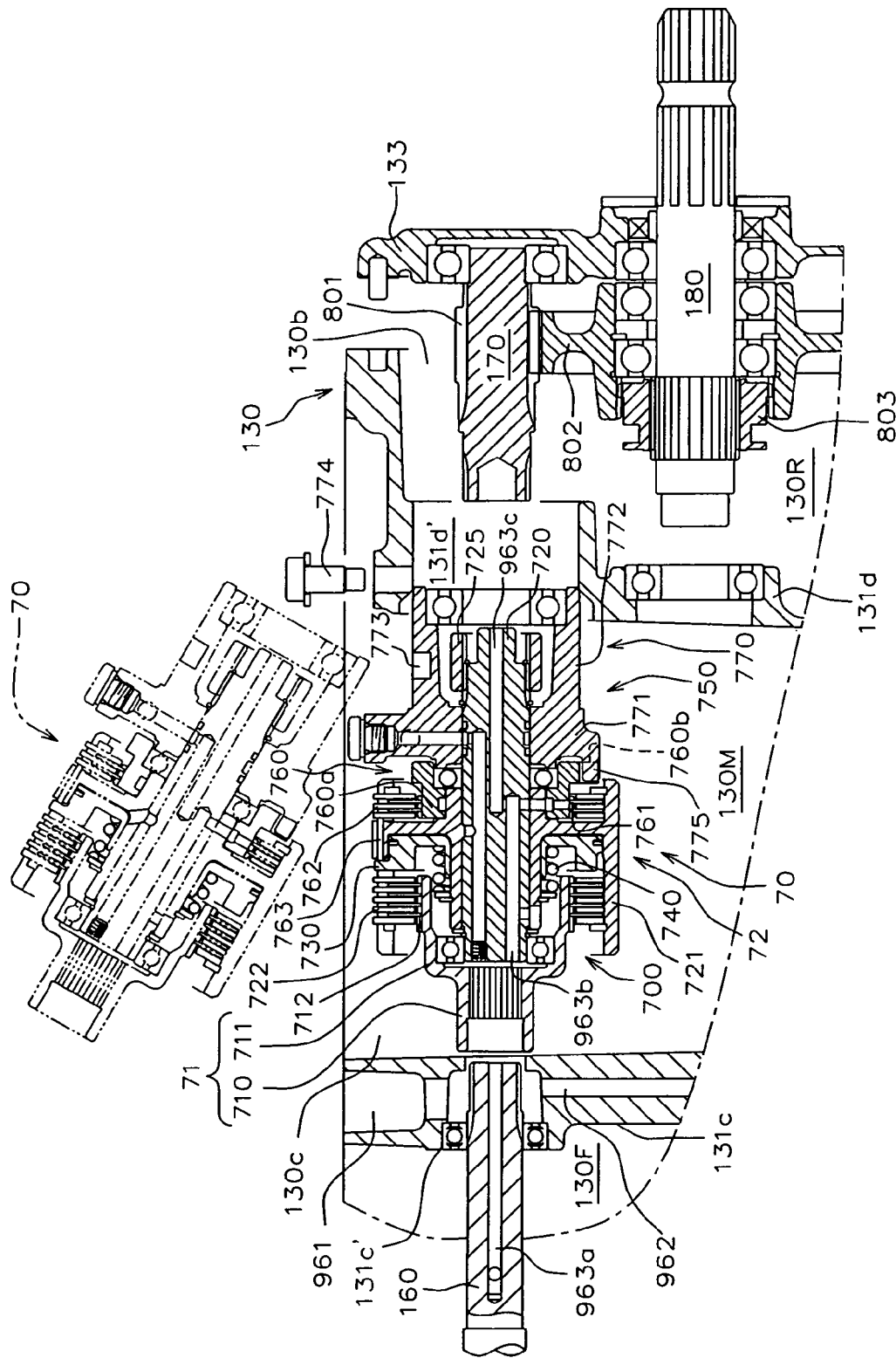
FIG. 11 is an exploded cross sectional view of the vicinity of the PTO clutch unit.

FIG. 11 is an exploded cross sectional view of the vicinity of the PTO clutch unit 70.

As shown in FIG. 11, in this embodiment, the fixed member 770 is detachably fixed and supported at the second wall 131d, and constitutes a part of the assembled PTO clutch unit 70.

That is, the second hole 131d' of the second wall 131d has a size capable of supporting the fixed member 770, the fixed member 770 being inserted through the second hole 131d' from the upstream side in the transmission direction (or from the middle chamber 130M).

More specifically, the fixed member 770 includes a bearing portion 771 including a bearing hole for supporting the output shaft 720 in a relatively rotatable manner, and a peripheral wall 772 extending from the bearing portion 771 toward the downstream side in the transmission direction, and the outer peripheral surface of the peripheral wall 772 is fixed and supported at the second hole 131d'.

An engaging hole 773 opened to the outer peripheral surface is provided in the peripheral wall 772, and the fixed member 770 is detachably and non-rotatably supported at the second wall 131d by a lock pin 774.

More specifically, an access hole communicating with the second hole 131d' is provided at the top of the second wall 131d (see FIG. 11). The lock pin 774 can be inserted to the engaging hole 773 by way of the access hole; thus, the fixed member 770 is detachably and non-rotatably supported at the second wall 131d.

The end of the peripheral wall 772 is configured so as to support the PTO driven shaft 170 in a rotatable manner about the axis line by way of the bearing member such as a bearing.

As such, in this embodiment, the second wall 131d is used as a member for supporting the fixed member 770 in the hydraulic brake mechanism 750; thus, the structure of the transmission case 130 is more simplified.

That is, in the conventional configuration in which the PTO clutch unit is arranged between the wall of the transmission case and the lid member, a configuration for supporting the fixed portion of the hydraulic brake mechanism must be separately provided upon additionally providing the hydraulic brake mechanism.

In this embodiment, on the other hand, the second wall 131d is used as the supporting member of the fixed member 770; therefore, the fixed member 770 can be supported without arranging an additional configuration.

Further, in this configuration, as shown in FIG. 11, the PTO clutch unit 70 can be temporarily supported by the PTO driving shaft 160 supported at the first wall 131c and the second wall 131d supporting the fixed member 770.

That is, in this embodiment, by after positioning the PTO clutch unit 70 in the middle chamber 130M, inserting the fixed member 770 through the second hole 131d' from the middle chamber 130M, and by inserting the PTO driving shaft 160 through the first hole 131c' from the upstream side in the transmission direction (from the front chamber 130F) so as to connect with the drive-side member 71, the PTO clutch unit 70 can be temporarily supported at the transmission case main body 131.

Therefore, the connecting task of the PTO clutch unit 70 and the PTO driven shaft 170 can be easily carried out.

The brake member 760 includes a main body 760a supported by the clutch housing 721, and a contacting portion 760b extending outwardly in the radial direction from the main body 760a, the contacting portion 760b contacting a stopping portion 775 of the fixed member 770 (see FIGS. 8 and 11).

The contacting portion 760b and the stopping portion 775 allow the brake member 760 and the fixed member 770 to be relatively rotatable about the axis line within an angular range of greater than 0° and smaller than 360°.

That is, when the brake member 760 is rotated toward one side (or a first side) about the axis line and the contacting portion 760b contacts the stopping portion 775, the brake member 760 cannot be rotated further toward the first side in the relative side about the axis line, but can be rotated toward the other side (or a second side which is a opposite direction to the first side) about the axis line within an angle smaller than 360°.

Such a configuration allows the brake member 760 to rotate toward the second side about the axis line within the angular range greater than 0° and smaller than 360° with respect to the fixed member 770 after the contacting portion 760b contacts the stopping portion 775; therefore, a "play" can be created in the PTO transmission path in the actuating state of the hydraulic brake mechanism 750, and the connecting task of PTO shafts 180, 190 (which will be described later) and the external working device can be easily carried out.

Further, as shown in FIGS. 4 and 11, the PTO system transmission mechanism comprises the rear PTO shaft 180 supported by the second wall 131c and the second lid member 133 in a relatively rotatable manner so that a first end (a rear end in this embodiment) extends outwardly, the mid-PTO shaft 190 (see FIG. 4) supported so that a first end (a front end in this embodiment) extends outwardly, and a PTO switching unit 80 for selectively performing the power transmission/ power interruption from the PTO driven shaft 170 to the rear PTO shaft 180 and/or the mid-PTO shaft 190.

In this embodiment, as best shown in FIG. 4, the PTO switching unit 80 comprises a first gear member 801 arranged in the PTO driven shaft 170, a second gear member 802 supported in a relatively rotatable manner at the rear PTO shaft 180 so as to mesh with the first gear 801, a rear PTO clutch sleeve 803 which is movable in the axis line direction and relatively non-rotatable to the rear PTO shaft 180, the rear PTO clutch sleeve 803 being configured so as to take an engaging position meshed with the internal gear provided in the second gear member 802 and a releasing position meshed with no internal gear, a third gear member 804 meshed with the second gear member 802, a first intermediate shaft 805 for supporting the third gear member 804 in a relatively non-rotatable manner, a fourth gear member 806 meshed with the third gear member 804, a second intermediate shaft 807 supported by the second wall 131d and the second lid member 133 in a rotatable manner, the second intermediate shaft 807 supporting the fourth gear member 806 in a relatively non-rotatable manner, a mid-PTO transmission shaft 808 arranged coaxially with the second intermediate shaft 807, a mid-PTO clutch sleeve 809 supported by the mid-PTO transmission shaft 808 and the second intermediate shaft 807 in a movable manner in the axis line direction, the mid-PTO clutch sleeve 809 being configured so as to take an engaging position connecting both shafts 807,808 in a relatively non-rotatable manner about the axis line and a releasing position having both shafts 807,808 in a relatively rotatable manner about the axis line, a mid-PTO case 820 detachably connected to one side wall of the transmission case 130, the mid-PTO case 820 supporting the mid-PTO shaft 190, and a gear train 825 for connecting the mid-PTO transmission shaft 808 to the mid-PTO shaft 190, the gear train 825 being supported by the mid-PTO case 820.

As such, in this embodiment, the rear chamber 130R of the transmission case 130 forms a third accommodating space for accommodating the main parts of the PTO switching unit 80 for transmitting the power from the PTO driven shaft 170 to the mid-PTO shaft 190 and/or the rear PTO shaft 180.

The vehicle 1 in this embodiment, as shown in FIG. 1, comprises a mower device 9 operatively driven by the mid-PTO shaft 190 below the housing structure 100.

The PTO system transmission mechanism further comprises a PTO operating unit 85 for synchronously operating the mid-PTO clutch sleeve 803 and the rear PTO clutch sleeve 809.

Figure 12:
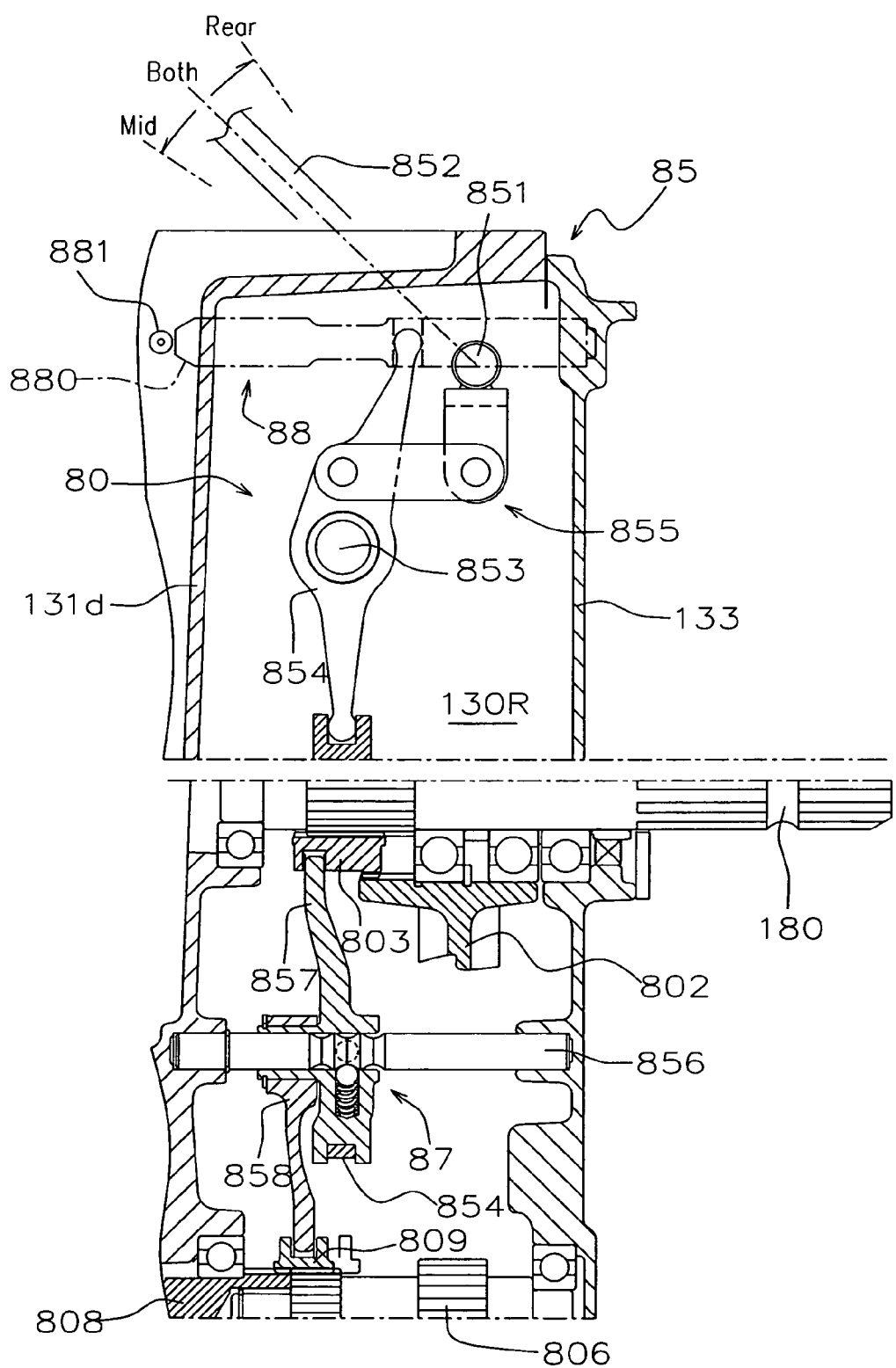
FIG. 12 is a partial longitudinal side view of a rear chamber of the transmission case, with cut along a cross section different from that of FIG. 4

FIG. 12 shows a partial longitudinal side view of the rear chamber 130R of the transmission case 130 cut along a cross section different from that of FIG. 4.

As shown in FIGS. 10 and 12, the PTO operating unit 85 comprises a PTO operating shaft 851 supported in a rotatable manner on its axis line at the transmission case 130 so that a first end and a second end are each positioned exterior to and interior to the transmission case 130, a PTO switching lever 852 connected in a relatively non-rotatable manner to the outer end of the PTO operating shaft 851, a PTO operating arm 854 freely oscillating about the pivot shaft 853 that is provided in the inner peripheral surface of one side wall of the transmission case 130 so as to be orthogonal to the rear PTO shaft 180, an intermediate link 855 for interlocking and engaging the inner end of the PTO operating shaft 851 and the PTO operating arm 854, the intermediate link 855 allowing the PTO operating arm 854 to oscillate about the pivot shaft 853 in accordance with the rotation about the axis line of the PTO operating shaft 851, a PTO fork shaft 856 supported by the second wall 131d and the second lid member 133 so as to be parallel with the rear PTO shaft 180, a rear PTO fork 857 supported in a movable manner in the axis line direction at the PTO fork shaft 856, the rear PTO fork 857 having a proximal end engaging with the free end of the PTO operating arm 854 and a free end engaging the rear PTO clutch sleeve 803, and a mid-PTO fork 858 supported in a non-movable manner about the axis line direction at the rear PTO fork 857, the mid-PTO fork 858 having a free end engaging with the mid-PTO clutch sleeve 809.

The PTO operating unit 85 operates as follows.

By directly or indirectly operating the PTO switching lever 852 to rotate the PTO operating shaft 851 about the axis line, the PTO operating arm 854 oscillates about the pivot shaft 853, and the rear PTO fork 857 and the mid-PTO fork 858 move along the axis line direction of the PTO fork shaft 856. With the movement of the rear PTO fork 857 and the mid-PTO fork 858, the rear PTO clutch sleeve 803 and the mid-PTO clutch sleeve 809 are pressed in conjunction therewith.

That is, the PTO operating unit 85 according to this embodiment is able to move both the rear PTO clutch sleeve 803 and the mid-PTO clutch sleeve 809 only by operating the PTO switching lever 852.

More specifically, the PTO fork shaft 856 is configured so as to take the rear PTO shaft output position for positioning only the rear PTO clutch sleeve 803 at the engaging position, a both PTO shaft output position for positioning both the rear PTO clutch sleeve 803 and the mid-PTO clutch sleeve 809 at the engaging position, and a mid-PTO shaft output position for positioning only the mid-PTO clutch sleeve 809 at the engaging position.

That is, by selectively positioning the PTO switching lever 852 at (1) rear output position, (2) simultaneous output position or (3) mid output position (see FIG. 12), the PTO fork shaft 856, the rear PTO fork 857, the mid-PTO fork 858, the rear PTO clutch sleeve 803, and the mid-PTO clutch sleeve 809 are configured to each take (1) a state of positioning only the rear PTO clutch sleeve 803 at the engaging position, (2) a state of simultaneously positioning both the rear PTO clutch sleeve 803 and the mid-PTO clutch sleeve 809 at the engaging position, and (3) a state of positioning only the mid-PTO clutch sleeve 809 at the engaging position.

Preferably, as shown in FIG. 12, a PTO detent mechanism 87 for holding each of the three output positions of the rear PTO fork 857 or the mid-PTO fork 858 and preventing an unintentional movement in the axis line direction from each of the positions may be provided in the PTO fork shaft 856.

More preferably, the PTO switching unit 80 may comprise a PTO output detection mechanism 88 for detecting the output state of both PTO shafts 180, 190.

The PTO output detection mechanism 88 includes a detection-target member 880 moving in the axis line direction in conjunction with the oscillation of the PTO operating arm 854 about the pivot shaft 853, the detection-target member 880 being of shaft shape supported by the second wall 131d and the second lid member 133 at a position above and toward one side of the rear chamber 130R, and first and second switches 881, 882 that are turned on/off in accordance with the position in the axis line direction of the detection-target member 880, the first and second switches 881, 882 being screw fitted from the outer side surface into the interior space the transmission case 130 (see FIG. 10).

In this embodiment, each sensor of the first and second switches 881, 882 arranged in parallel with each other so as to be orthogonal to the detection-target member 880 projects into the rear chamber 130R, and is configured so as to be in the OFF state upon engaging with a recess formed in the outer surface of the detection-target member 880 and in the ON state upon engaging with the outer surface other than the recess in the detection-target member 880.

Specifically, the first and second switches 881, 882 and the detection-target member 880 are configured so as to output signals of different combination for each of when only the rear PTO shaft 180 is in the output state, when both the rear PTO shaft 180 and the mid-PTO shaft 190 are in the output state, and when only the mid-PTO shaft 190 is in the output state.

The hydraulic mechanism 90 of the working vehicle according to this embodiment will now be described.

Figure 13:
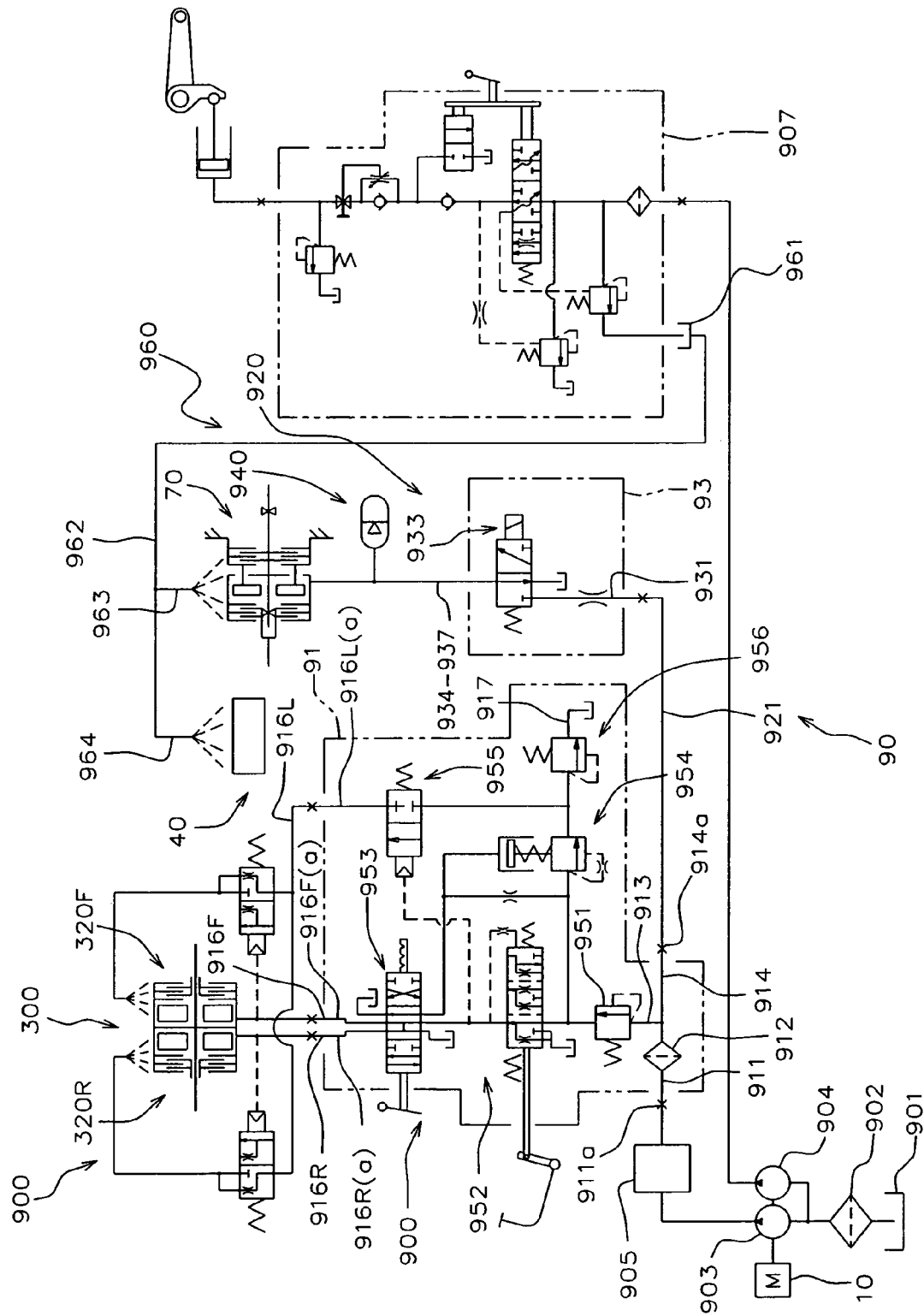
FIG. 13 is a hydraulic circuit diagram of the working vehicle.

FIG. 13 shows a hydraulic circuit diagram of the working vehicle.

As shown in FIG. 13, the hydraulic mechanism 90 comprises a tank 901 for storing hydraulic oil, and first and second hydraulic pumps 903, 904 for drawing stored oil from the tank 901 by way of the filter 902.

In this embodiment, at least a part of the interior space of the housing structure 100 also serves as the tank 901.

That is, the flywheel housing 110, the intermediate housing 120 and the transmission case 130 are configured to form accommodating spaces of various power transmission mechanisms and to form one part of a chassis, and so that at least a part of the interior space form a storage space where the oil can be stored.

More specifically, the interior space of the intermediate housing 120, the interior space of the transmission case 130 and the interior space of the reversal housing 310 are used as the oil storage space.

Here, the flywheel accommodating space (the space other than the reversal housing occupying space of the interior space of the flywheel housing) of the flywheel housing 110 acts as a dry chamber.

The hydraulic mechanism 90 further includes a reversal hydraulic circuit 900 for sending the hydraulic oil supplied from the first hydraulic pump 903 to the reversal unit 300.

Here, in this embodiment, a power steering hydraulic circuit 905 is inserted between the first hydraulic pump 903 and the reversal hydraulic circuit 900, and the pressure oil from the first hydraulic pump 903 is also used as the power steering hydraulic oil.

Figure 14:
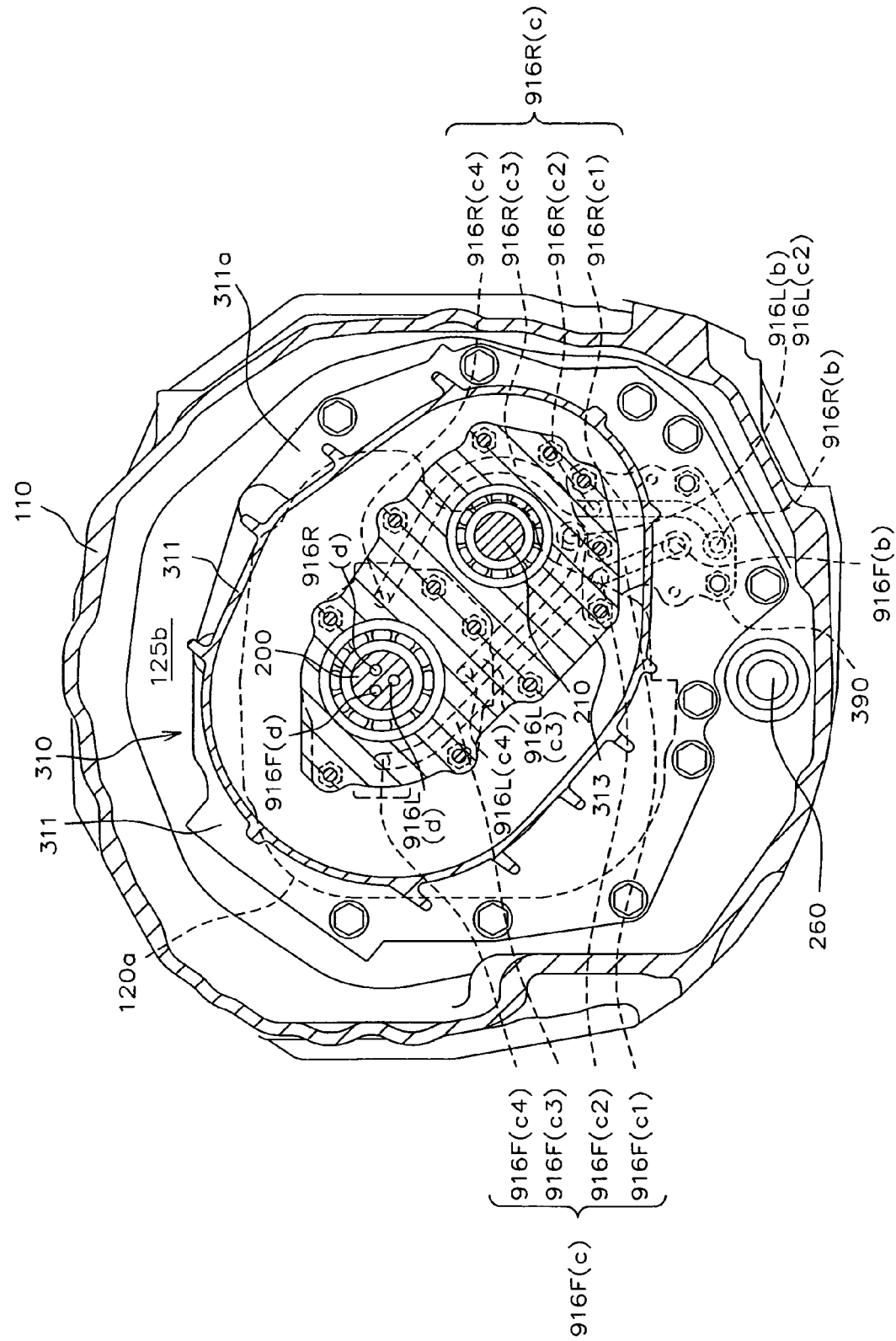
FIG. 14 is a cross sectional view taken along line XIV-XIV of FIG. 3.
Figure 15:
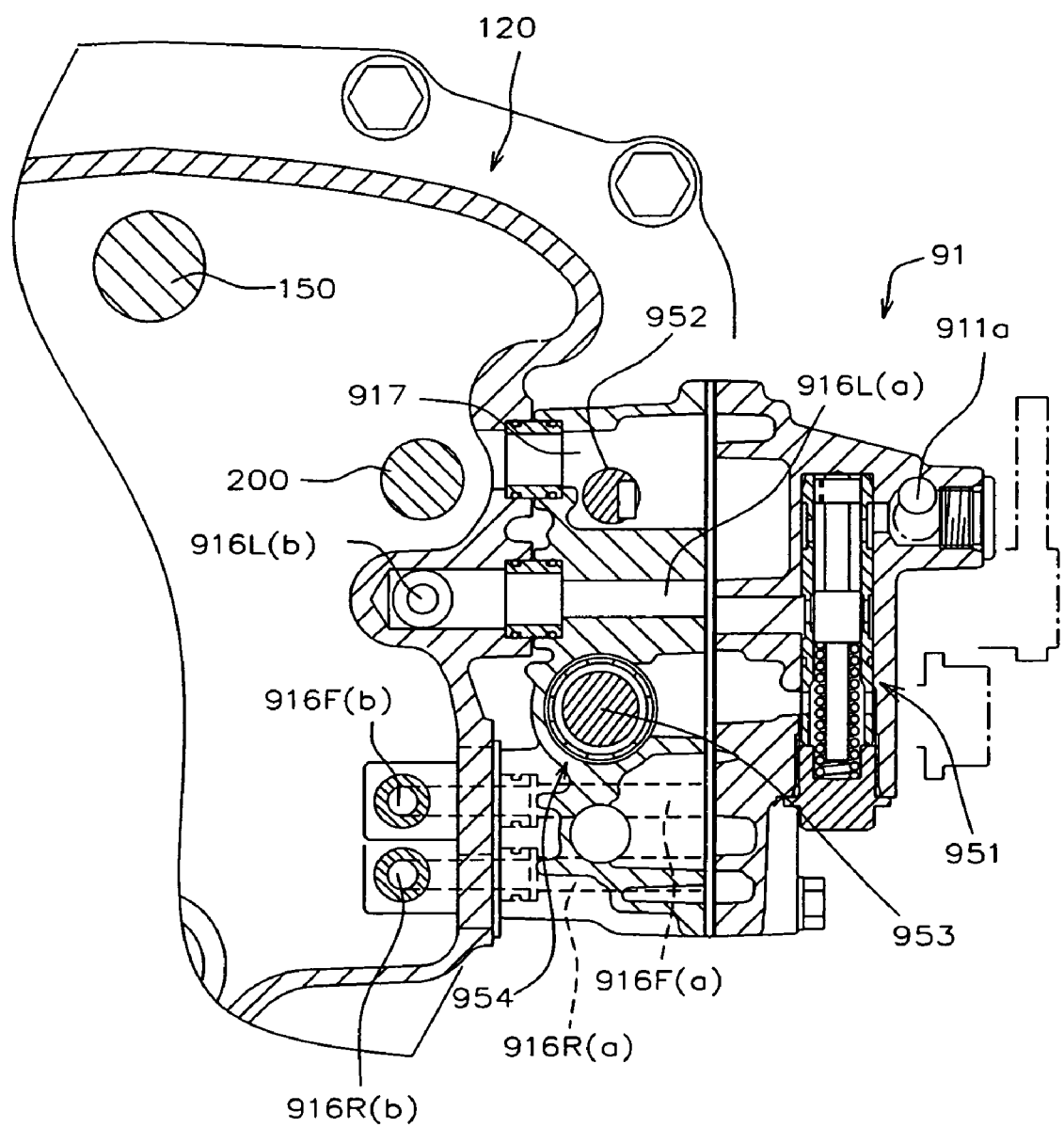
FIG. 15 is a cross sectional view taken along line XV-XV of FIG. 3.
Figure 16:
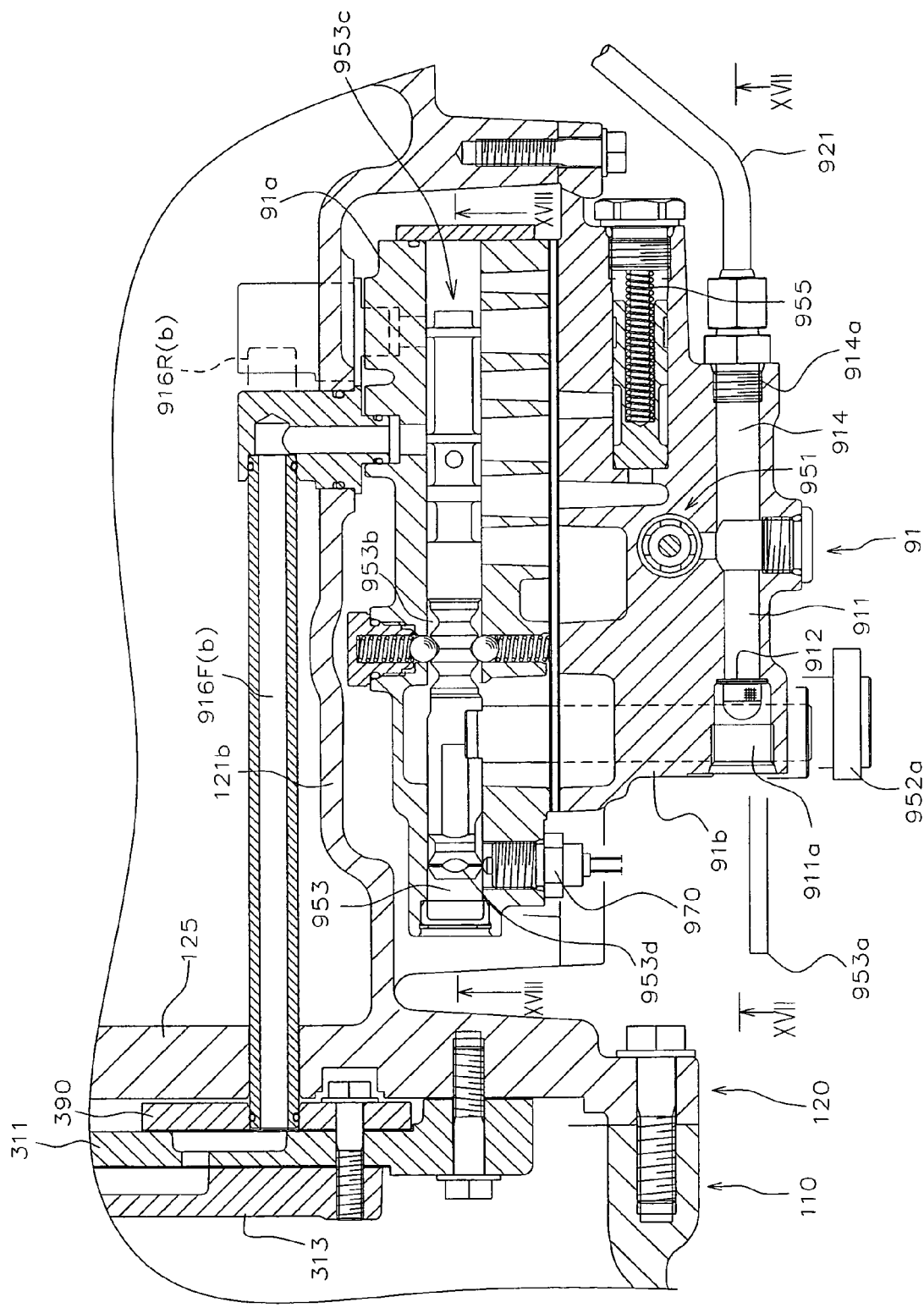
FIG. 16 is a cross sectional view taken along line XVI-XVI of FIG. 3.

FIGS. 14 to 16 each show a cross sectional view taken along line XIV-XIV, line XV-XV, and line XVI-XVI of FIG. 3.

Figure 17:
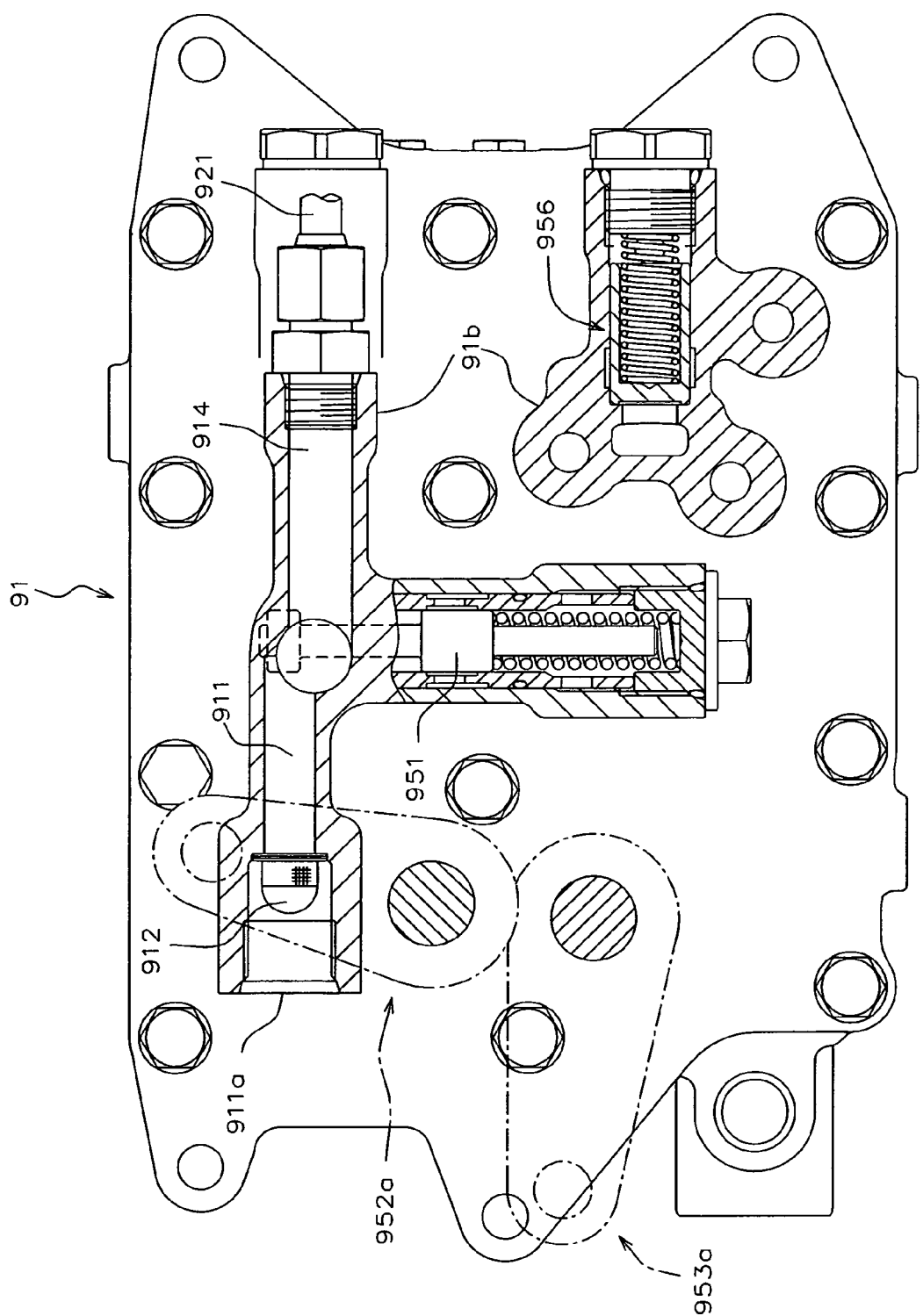
FIG. 17 is a cross sectional view taken along line XVII-XVII of FIG. 16.
Figure 18:
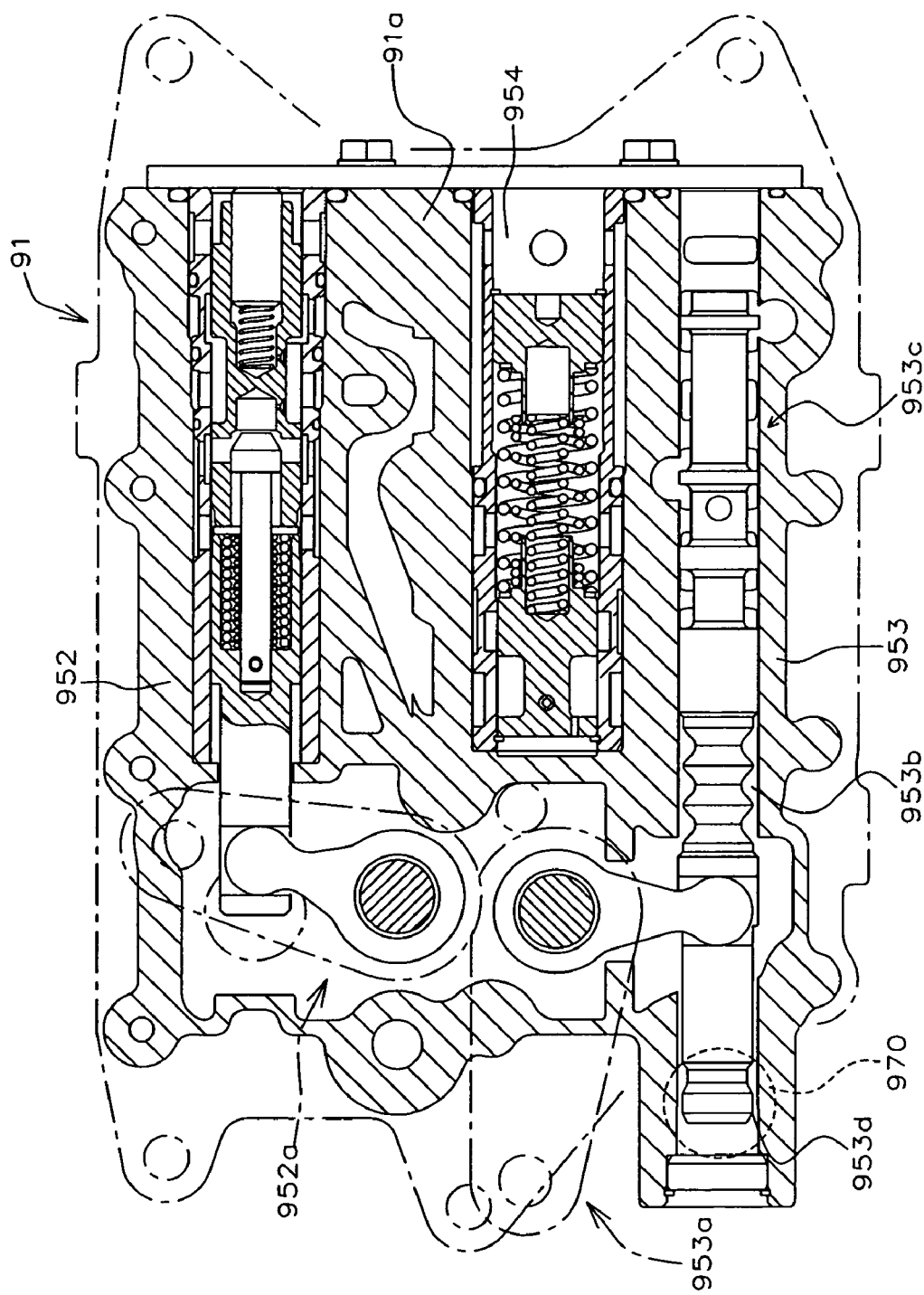
FIG. 18 is a cross sectional view taken along line XVIII-XVIII of FIG. 16.

Further, FIGS. 17 and 18 each show a cross sectional view taken along line XVII-XVII and line XVIII-XVIII of FIG. 16.

In this embodiment, the reversal hydraulic circuit 900 includes a power reversal valve 91 connected to a location closer to the front of a first side wall of the intermediate housing 120 (see FIGS. 1, 3, 14 and 15).

The power reversal valve 91 comprises an input line 911 for receiving pressure oil from the first hydraulic pump 903 by way of an input port 911a opened at the outer surface of the valve case, a line filter 912 inserted in the input line 911, first and second output lines 913, 914 branched from the input line 911 at the rear stream side of the line filter 912, a resistance valve 951, a clutch pressure reducing valve 952 and a direction switching valve 953 inserted in the first output line 913, oil paths 916F(a), 916R(a) arranged on the secondary side of the direction switching valve 953, the oil paths 916F(a), 916R(a) forming a part of the forward-movement line 916F and the rearward-movement line 916R, a delay relief valve 954 for gradually increasing the primary side oil pressure of the clutch pressure reducing valve 952 to a set oil pressure, an oil path 916L(a) arranged on the secondary side of the delay relief valve 954, the oil path 916L(a) forming a part of the lubricating line 916L, a lubricating oil ON/OFF switching valve 955 for communicating/shutting down the lubricating line 916L in accordance with the secondary side oil pressure of the clutch pressure reducing valve 952, a lubricating oil relief valve 956 for setting the oil pressure of the lubricating line 916L, and a drain line 917 for discharging the drain oil from the lubricating relief valve 956 to the storage space 901.

In this embodiment, the valve case of the power reversal valve 91 includes an inner case section 91a and an outer case section 91b joined with respect to each other.

The clutch pressure reducing valve 952, the direction switching valve 953, and the delay relief valve 954 are arranged in the inner case section 91a with each of the axis line direction parallel with respect to each other so as to lie along the front-to-rear direction of the body. The resistance valve 951 and the lubricating oil relief valve 956 are arranged in the outer case section 91b.

The reference characters 952a, 953a in FIGS. 17 and 18 are each operating mechanism for movement operation of the clutch pressure reducing valve 952 and the direction switching valve 953. Further, a neutral sensing portion 953d is extended and formed on the other side of the oil pressure switch-over land portion 953c with a ball detent groove 953b in the valve body of the direction switching valve 953 in between. The inner case section 91a accommodating the neutral sensing portion 953d is set larger than the outer case section 91b, and an engine start switch 970 cooperating with the neutral sensing portion 953b is provided on the outer surface of the inner case section 91a.

As shown in for example, FIGS. 3, 5, and 14 to 16, the forward-movement line 916F and the rearward-movement line 916R each includes oil paths 916F(a), 916R(a) communicated with respect to each other, conduits 916F(b), 916R(b), first oil paths 916F(c), 916R(c), oil paths 916F(d), 916R(d), and axis line holes 916F(e), 916R(e).

The oil paths 916F(a), 916R(a) are formed in the reversal valve 91.

The conduits 916F(b), 916R(b) are each arranged in the intermediate housing 120 so that a first end communicates with the oil paths 916F(a), 916R(a) and a second end opens to the front end of the supporting surface 125b of the front flange 125 in the intermediate housing 120.

The first oil paths 916F(c), 916R(c) are formed in the end wall 311a of the reversal housing 310.

The oil paths 916F(d), 916R(d) are formed in a seal case 380 connected to the end wall 311a of the reversal housing 310 so as to surround the driving shaft 200.

The axis line holes 916F(e), 916R(e) are formed in the driving shaft 200.

A detailed configuration of the first oil paths 916F(c), 916R(c) will now be described using the first oil path 916F(c) of the forward-movement line 916F by way of an example.

Here, the first oil path 916R(c) of the rearward-movement line 916R is denoted with the same reference character but with the subscript changed to "R"; therefore, the description thereof will not be given herein.

As best shown in FIG. 4, the first oil path 916F(c) includes a first groove 916F(c1) formed on the surface opposing the supporting surface 125b of the intermediate housing 120 at the end wall 311a of the reversal housing 310, a first through hole 916F(c2) for opening the terminating end of the first groove 916F(c1) onto the joining surface side with respect to the bearing plate 313, a second groove 916F(c3) formed in the bearing plate 313 detachably connected to the end wall 311 in the reversal housing 310 so as to bearing support the driving shaft 200, the second groove 916F(c3) having a starting end communicated with the first through hole 916F(c2), and a second through hole 916F(c4) formed in the end wall 311a, the second through hole 916F(c4) opening the terminating end of the second groove 916F(c3) onto the joining surface side with respect to the seal case 380.

The first groove 916F(c1) forms the oil path by being covered with a cover 390 connected to the surface opposing the end wall 311a in the reversal housing 310, and the conduit 916F(b) passing through the cover 390 is communicated with the starting end of the first groove 916F(c1). Further, the second groove 916F(c3) forms the oil path by being covered with the end wall 311a in the reversal housing 310.

The lubricating oil line 916L includes a first oil path 916L (c) formed in the end wall 311a of the reversal housing 310 so as to connect with the oil path 916L(a) of the reversal valve 91 by way of the oil path 916L(b) perforated on one side wall of the intermediate housing 120.

Specifically, the oil path 916L(c) includes a first through hole 916L(c2) communicated with the oil path 916L(b) and opened onto the joining surface side with respect to the bearing plate 313, a first groove 916(c3) formed in the bearing plate 313, the first groove 916L(c3) communicating with the first through hole 916(c2) at the starting end thereof, and a second through hole 916(c4) formed on the end wall 311a, the second through hole 916L(c4) opening the terminating end of the first groove 916L(c3) onto the joining surface side with respect to the seal case 380.

The forward-movement oil path 916F(d) formed in the seal case 380 so as to connect with the second through hole 916F(c4) of the end wall 311a and the forward-movement axis line hole 916F(e) formed in the driving shaft 200 are communicated by way of an annular groove formed in the contacting surface of the seal case 380 and the driving shaft 200.

Similarly, the rearward-movement oil path 916R(d) formed in the seal case 380 so as to connect with the second through hole 916R(c4) of the end wall 311a and the rearward-movement axis line hole 916R(e) formed in the driving shaft 200 are communicated by way of an annular groove formed in the contacting surface of the seal case 380 and the driving shaft 200.

Similarly, the lubricating oil path 916R(d) formed in the seal case 380 so as to connect with the second through hole 916L(c4) of the end wall 311a and the lubricating axis line hole 916L(e) formed in the driving shaft 200 are communicated by way of an annular groove formed in the contacting surface of the seal case 380 and the driving shaft 200.

With such a configuration, only by simply attaching the reversal housing 310 of the forward/rearward movement switching unit 30 assembled including the seal case 380 to the supporting surface 125b in the front flange 125 of the intermediate housing 120, the reversal valve 91 and the forward-movement clutch device 320F, as well as the rearward-movement clutch device 320R are fluidly connected.

The hydraulic mechanism 90 further includes a PTO hydraulic circuit 920 communicated with the second output line 914.

The PTO hydraulic circuit 920 includes a PTO line for supplying hydraulic oil to the PTO clutch unit 70, and a switching member for selectively communicating/shutting down the PTO line.

As shown in FIGS. 3, 8, 13 and the like, the PTO line includes a first external conduit 921 connected to the output port 914a opened on the outer surface of the valve case of the reversal valve 91, an oil path 931 formed in the PTO valve 93 installed on one side wall 131b of the transmission case 130, the oil path 931 having one end communicated with the first external conduit 921, a second external conduit 934 communicated with the second end of the oil path 931 by way of a connecting member which can selectively change a connecting state or a disconnecting state, an internal conduit 935 arranged inside the transmission case 130 so as to communicate with the second external conduit 934 through one side wall 131b of the transmission case 130, a first oil path 936 formed in the fixed member 770 so that one end communicates with the internal conduit 935 and the other end opens at the contacting surface with respect to the output shaft 720 of the bearing 771, and a second oil path 937 formed in the output shaft 720 so as to communicate with the first oil path 936.

Here, the first oil path 936 and the second oil path 937 are communicated by way of an annular groove 937a formed in the contacting surface of the bearing 771 of the fixed member 770 and the output shaft 720.

Further, the switching member includes a solenoid valve 933 inserted in the oil path 931.

The PTO hydraulic circuit 920 also includes an accumulator 940 to gradually increase the oil pressure of the PTO line.

The accumulator 940 includes an accumulator housing 941 communicated with the PTO line, and an accumulator main body 942 accommodated in the accumulator housing 941 (see FIG. 10).

In this embodiment, as shown in FIG. 10, the tubular accumulator housing 941 having both ends opened is supported substantially parallel to the PTO driven shaft 170 by the second wall 131d and the second lid member 133 so as to close the opening on both ends.

The accumulator housing 941 is communicated with the PTO line by way of the third oil path 943 formed in the fixed member 770 so as to connect with the annular groove 937a and the conduit 944 connected to the third oil path 943.

The conduit 944 is held by the second wall 131d, and is opened to the pressure receiving chamber 942a formed between the second wall 131d and the accumulator main body 924.

Thus, with the supply of hydraulic oil to the PTO clutch unit 70, the pressure oil thereof is accumulated in the accumulator 940 from the third oil path 943 through the conduit 944, and thus the impact during clutch connection is alleviated.

The hydraulic mechanism 90 also includes a lubricating hydraulic circuit 960.

In this embodiment, the lubricating hydraulic circuit 960 includes a lubricating oil source 961 for receiving and storing the relief oil from the hydraulic lift oil pressure supply valve 907, provided in the hydraulic lift case 20 and to which the pressure oil from the second hydraulic pump 904 is supplied, and supplying it to the PTO clutch unit 70 and the speed-change unit 40 as a lubricating oil.

The lubricating oil source 961 includes a recessed portion opened at the upper end face of the transmission case main body 131 at which the hydraulic lift case 20 is installed.

More specifically, the lubricating oil source 961 is formed so as to be opened at the upper end face of the first wall 131c (see FIGS. 4 and 11).

According to this configuration, the relief oil can be efficiently received from the hydraulic lift oil pressure supply valve 907 provided in the hydraulic lift case which acts as the upper lid member.

The lubricating oil source 961, as shown in FIGS. 4 and 13, is branch communicated to both the PTO lubricating line 963 and the speed-change lubricating line 964 by way of a common oil path 962 perforated in the first wall 131c of the transmission case 130.

The PTO lubricating line 963, as shown in FIGS. 4 and 11, includes a linear first oil path 963a perforated in the PTO driving shaft 160 so that a first end communicates with the common oil path 962 and a second end opens at the surface opposing the output shaft 720, an L-shaped second oil path 963b perforated in the output shaft 720 so that a first end opens at the surface opposing the PTO driving shaft 160 and a second end opens toward each lubrication-target locations of the PTO hydraulic clutch mechanism 700 and the PTO hydraulic brake mechanism 750, and an L-shaped third oil path 963c perforated in the output shaft 720 so that a first end communicates with the second oil path 963b and a second end opens at the surface opposing the PTO driven shaft 170.

Here, the bearing member provided at the first hole 131c' for supporting the PTO driving shaft 160 is equipped with an oil seal, and is configured so that the lubricating oil within the lubricating oil source 961 is not wastefully leaked regardless of the fact that the PTO driving shaft 160 is passed through the common oil path 962.

In this embodiment, as shown in FIGS. 4 and 11, the output shaft 720 and the PTO driven shaft 170 are connected in a relatively non-rotatable manner about the axis line by way of a coupling 725 with the respective opposing ends facing each other within the coupling 725, and the lubricating oil is retained at the connecting location of the output shaft 720 and the PTO driven shaft 170.

More preferably, the opposing ends of the output shaft 720 and the PTO driven shaft 170 are configured so as to be convex-concave engaged.

With this configuration, the lubricating oil supplied by way of the third axis line hole 963c can be effectively retained while stably supporting the output shaft 720.

The speed-change lubricating line 964 includes an axis line hole 964a perforated in the main speed-change shaft 410 so that a first end communicates with the common oil path 962 and a second end opens toward each lubrication-target locations of, for example, the friction surface of the first and the second synchronized meshing devices 410L, 410H.

In this embodiment, two hydraulic pumps (first and second hydraulic pumps 903, 904) are provided; however, this is in consideration of the overload on the each hydraulic pump. Therefore, the number of hydraulic pumps may be appropriately set in accordance with the additionally-provided hydraulic circuits.

In this embodiment, various hydraulic circuits are provided, but these hydraulic circuits may of course be appropriately deleted, changed, or added depending on the specification of the vehicle.

This specification is by no means intended to restrict the present invention to the preferred embodiments set forth therein. Various modifications to the PTO transmission mechanism as described herein, may be made by those skilled in the art without departing from the spirit and scope of the present invention as defined in the appended claims.

What is claimed is:

1. A PTO transmission structure comprising a PTO driving shaft operatively connected to a driving source, a PTO driven shaft arranged on a downstream side in a transmission direction of said PTO driving shaft, a PTO clutch unit for selectively performing power transmission/power interruption from said PTO driving shaft to said PTO driven shaft, and a transmission case for supporting said PTO driving shaft and said PTO driven shaft and for accommodating said PTO clutch unit, wherein:

said transmission case comprises a case main body which includes a first wall having a first hole for supporting said PTO driving shaft, and a second wall having a second hole for supporting said PTO driven shaft, said second wall being spaced apart from said first wall so as to define a first accommodating space to position said PTO clutch unit between said first wall and said second wall;

said PTO clutch unit includes a drive-side member which is separate from said PTO driving shaft and which is capable of being operatively connected to said PTO driving shaft in a relatively non-rotatable manner around an axis line, an output shaft member which is separate from said PTO driven shaft and which is capable of being operatively connected to said PTO driven shaft in a relatively non-rotatable manner around an axis line, and a hydraulic clutch mechanism supported by said drive-side member and said output shaft member for selectively performing power transmission/power interruption from said drive-side member to said output shaft member; and each of said PTO driving shaft and said PTO driven shaft is connected to said drive-side member and said output shaft member, respectively, of said PTO clutch unit by inserting said PTO driving shaft through said first hole from the upstream side in the transmission direction of said first wall and inserting said PTO driven shaft through said second hole from the downstream side in the transmission direction of said second wall with said PTO clutch unit positioned in said first accommodating space.

2. The PTO transmission structure according to claim 1, wherein:

a differential gear unit is arranged between said first wall and said second wall, and below said PTO clutch unit in said transmission case.

3. The PTO transmission structure according to claim 1, wherein:

said PTO clutch unit comprises a hydraulic brake mechanism for applying/releasing a braking power to/from said output shaft member when the hydraulic clutch mechanism is in the power interrupting state/the power transmitting state;

said hydraulic brake mechanism includes a brake member which is relatively non-rotatable with respect to said output shaft member when said braking power is applied, and a fixed member for engaging with the brake member to stop the rotation of the brake member; and said fixed member is detachably and non-rotatably supported at said second wall.

4. The PTO transmission structure according to claim 3, wherein:

said brake member is rotatable within an angular range of greater than 0° and smaller than 360° with respect to said fixed member.

5. The PTO transmission structure according to claim 3, wherein:

said output shaft member includes an output shaft arranged coaxially with said PTO driving shaft and connected to said PTO driven shaft in a relatively non-rotatable manner about the axis line, and a clutch housing externally inserted in a relatively non-rotatable manner to the output shaft;

said hydraulic clutch mechanism further comprises a drive-side friction plate supported in a relatively non-rotatable manner at said drive-side member, a driven-side friction plate supported in a relatively non-rotatable manner at said clutch housing, said driven-side friction plate being arranged facing said drive-side friction plate, a piston for frictionally contacting said drive-side friction plate and said driven-side friction plate by the action of the oil pressure, and a biasing member for biasing said piston toward a direction away from said drive-side friction plate and said driven-side friction plate; and said hydraulic brake mechanism comprises a driven-side friction plate supported in a relatively non-rotatable manner at said brake member, a drive-side friction plate arranged in a relatively non-rotatable manner at said clutch housing so as to face the driven-side friction plate, and a pressing member connected in a relatively non-movable manner in the axis direction to said piston by way of a coupling rod.

6. The PTO transmission structure according to claim 5, wherein:

said output shaft is internally inserted and supported in a relatively rotatable manner at said fixed member;

first and second oil paths for hydraulic oil acting on said piston are perforated in said output shaft and said fixed member, respectively; and said first oil path and said second oil path are communicated by way of an annular groove formed at the contacting location of said output shaft and said fixed member.

7. The PTO transmission structure according to claim 5, wherein:

said output shaft and said PTO driven shaft are connected in a relatively non-rotatable manner about the axis line by way of a coupling with respective opposing ends facing each other; and a lubricating oil path opened at the end opposing said PTO driven shaft is perforated in said output shaft.

8. The PTO transmission structure according to claim 7, wherein:

the opposing ends of said output shaft and said PTO driven shaft are configured so as to concave-convex engage with each other.

9. The PTO transmission structure according to claim 1, wherein:

said case main body includes a bottom wall extending along the transmission direction so as to be laid across said first and second walls, and a pair of side walls extending upward from the bottom wall, and has an upstream-side opening at the upstream side in the transmission direction, a downstream-side opening at the downstream side in the transmission direction, and an upper-side opening at the upper portion of between said first wall and said second wall opened;

said transmission case further comprises an upper lid member for covering said upper-side opening; and said PTO clutch unit is configured so as to be inserted into said first accommodating space from the upper-side opening of the case main body.

10. The PTO transmission structure according to claim 9, wherein:

said transmission case further comprises a first lid member detachably connected to said case main body so as to close the upstream-side opening to form a second accommodating space between said first lid member and said first wall; and said second accommodating space accommodates a speed-change unit for a traveling system transmission mechanism.

11. The PTO transmission structure according to claim 9, wherein:

said transmission case further comprises a second lid member detachably connected to said case main body so as to close the downstream-side opening to form a third accommodating space between said second lid member and said second wall; and said third accommodating space accommodates a PTO transmission gear train succeeding said PTO driven shaft.

12. The PTO transmission structure according to claim 9, wherein:

a lubricating oil path for supplying lubricating oil in the direction toward said PTO clutch unit by way of said PTO driving shaft is formed in said first wall of said transmission case.

13. The PTO transmission structure according to claim 12, wherein:

an oil sump communicating with the starting end side of said lubricating oil path is formed at a joining surface of said first wall and said upper lid member of said transmission case.

14. The PTO transmission structure comprising a PTO driving shaft operatively connected to a driving source, a PTO driven shaft arranged on a downstream side in a transmission direction of said PTO driving shaft, a PTO clutch unit for selectively performing power transmission/power interruption from said PTO driving shaft to said PTO driven shaft, and a transmission case for supporting said PTO driving shaft and said PTO driven shaft and for accommodating said PTO clutch unit, wherein:

said transmission case comprises a case main body which includes a first wall having a first hole for supporting said PTO driving shaft, and a second wall having a second hole for supporting said PTO driven shaft, said second wall being spaced apart from said first wall so as to define a first accommodating space to position said PTO clutch unit between said first wall and said second wall;

said PTO clutch unit includes a drive-side member operatively connected to said PTO driving shaft, and an output shaft member operatively connected to said PTO driven shaft;

each of said PTO driving shaft and said PTO driven shaft is connected to said drive-side member and said output shaft member, respectively, of said PTO clutch unit by inserting said PTO driving shaft through said first hole from the upstream side in the transmission direction of said first wall and inserting said PTO driven shaft through said second hole from the downstream side in the transmission direction of said second wall with said PTO clutch unit positioned in said first accommodating space, said output shaft member of said PTO clutch unit includes an output shaft arranged coaxially with said PTO driving shaft and connected to said PTO driven shaft in a relatively non-rotatable manner about the axis line and a clutch housing externally inserted to the output shaft in a relatively non-rotatable manner, and is configured so as to form a hydraulic clutch mechanism which selectively performs power transmission/power interruption to said output shaft between said drive-side member and said clutch housing; and an oil path for introducing hydraulic oil to said hydraulic clutch mechanism through an annular groove formed in an outer peripheral surface adjacent the installation portion of said clutch housing is perforated in said output shaft.

* * * * *